US010863533B2

(12) United States Patent
Urabayashi et al.

(10) Patent No.: US 10,863,533 B2
(45) Date of Patent: Dec. 8, 2020

(54) BASE STATION

(71) Applicant: KYOCERA CORPORATION, Kyoto (JP)

(72) Inventors: Hiroyuki Urabayashi, Yokohama (JP); Chiharu Yamazaki, Tokyo (JP); Naohisa Matsumoto, Higashiomi (JP); Noriyoshi Fukuta, Inagi (JP); Masato Fujishiro, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 107 days.

(21) Appl. No.: 15/933,782

(22) Filed: Mar. 23, 2018

(65) Prior Publication Data

US 2018/0220442 A1    Aug. 2, 2018

Related U.S. Application Data

(63) Continuation of application No. PCT/JP2016/077988, filed on Sep. 23, 2016.
(Continued)

(51) Int. Cl.
*H04W 72/12*    (2009.01)
*H04W 16/14*    (2009.01)
(Continued)

(52) U.S. Cl.
CPC ....... *H04W 72/1273* (2013.01); *H04L 5/0048* (2013.01); *H04L 27/0006* (2013.01);
(Continued)

(58) Field of Classification Search
None
See application file for complete search history.

(56) References Cited

U.S. PATENT DOCUMENTS

2007/0147284 A1* 6/2007 Sammour ......... H04W 52/0216
370/328
2012/0155561 A1* 6/2012 Seo ................... H04B 7/15542
375/260
(Continued)

FOREIGN PATENT DOCUMENTS

CN    105338568 A  *  2/2016  ............ H04W 72/12
WO    2015/098880 A1    7/2015

OTHER PUBLICATIONS

International Search Report issued in PCT/JP2016/077988; dated Nov. 22, 2016.
(Continued)

*Primary Examiner* — Andre Tacdiran
(74) *Attorney, Agent, or Firm* — Studebaker & Brackett PC

(57) ABSTRACT

A base station according to an embodiment includes a controller configured to perform a process of transmitting, in a specific frequency band shared by a plurality of operators and/or a plurality of communication systems, a burst signal including data or a control signal and a discovery reference signal including a reference signal and/or a synchronization signal. If there is a transmission duration of the discovery signal within a transmission duration of the burst signal after starting the transmission of the burst signal, the controller performs a process of transmitting the discovery reference signal even within the transmission duration of the burst signal.

7 Claims, 14 Drawing Sheets

Related U.S. Application Data

(60) Provisional application No. 62/232,862, filed on Sep. 25, 2015.

(51) Int. Cl.

| | |
|---|---|
| *H04L 27/00* | (2006.01) |
| *H04W 56/00* | (2009.01) |
| *H04W 48/12* | (2009.01) |
| *H04L 5/00* | (2006.01) |
| *H04W 72/04* | (2009.01) |
| *H04W 88/08* | (2009.01) |
| *H04W 88/12* | (2009.01) |

(52) U.S. Cl.
CPC .......... *H04W 16/14* (2013.01); *H04W 48/12* (2013.01); *H04W 56/0015* (2013.01); *H04W 72/044* (2013.01); *H04W 72/1247* (2013.01); *H04W 88/08* (2013.01); *H04W 88/12* (2013.01)

(56) References Cited

U.S. PATENT DOCUMENTS

| | | | | |
|---|---|---|---|---|
| 2015/0163042 A1* | 6/2015 | Tsuda | .................... | H04L 1/0002 370/329 |
| 2015/0327226 A1* | 11/2015 | Cheng | ............... | H04W 72/1289 370/329 |
| 2016/0227519 A1* | 8/2016 | Nimbalker | ............ | H04L 5/0048 |
| 2017/0034808 A1 | 2/2017 | Ouchi et al. | | |
| 2018/0176944 A1* | 6/2018 | Wang | ................ | H04W 72/0446 |

OTHER PUBLICATIONS

Sharp; "DRS Design for LAA"; 3GPP TSG RAN WG1 #82; R1-154067; Aug. 24-28, 2015; pp. 1-4; Beijing, China.

ETRI; "Required Functionalities and Possible Solution Related to SCE Operation in Unlicensed Carrier"; 3GPP TSG RAN WG1 Meeting #79; R1-144921; Nov. 17-21, 2014; pp. 1-7; San Francisco, USA.

LG Electronics; "Consideration on LAA UE RF Issues"; 3GPP TSG RAN WG4 Meeting #76; R4-154913; Aug. 24-28, 2015; pp. 1-6; Beijing, China.

CATT; "Design of LAA DRS"; 3GPP TSG RAN WG1 Meeting #82; R1-153923; Aug. 24-28, 2015; pp. 1-3; Beijing, China.

Kyocera; "Initial Signal Design for LAA"; 3GPP TSG RAN WG1 Meeting #80bis; R1-151462; Apr. 20-24, 2015; pp. 1-4; Belgrade, Serbia.

Samsung; "Discussion on LAA DRS Design"; 3GPP TSG RAN WG1 Meeting #81; R1-152866; May 25-29, 2015; pp. 1-8; Fukuoka, Japan.

Kyocera; "DRS Design from the Aspect of Multiplexing PDSCH and DRS"; 3GPP TSG RAN WG1 Meeting #82bis; R1-155532; Oct. 5-9, 2015; pp. 1-4; Malmo, Sweden.

ETRI; "DRS Transmission Over Unlicensed Carrier"; 3GPP TSG RAN WG1 Meeting #82-bis; R1-155830; Oct. 5-9, 2015; pp. 1-7; Malmo, Sweden.

* cited by examiner

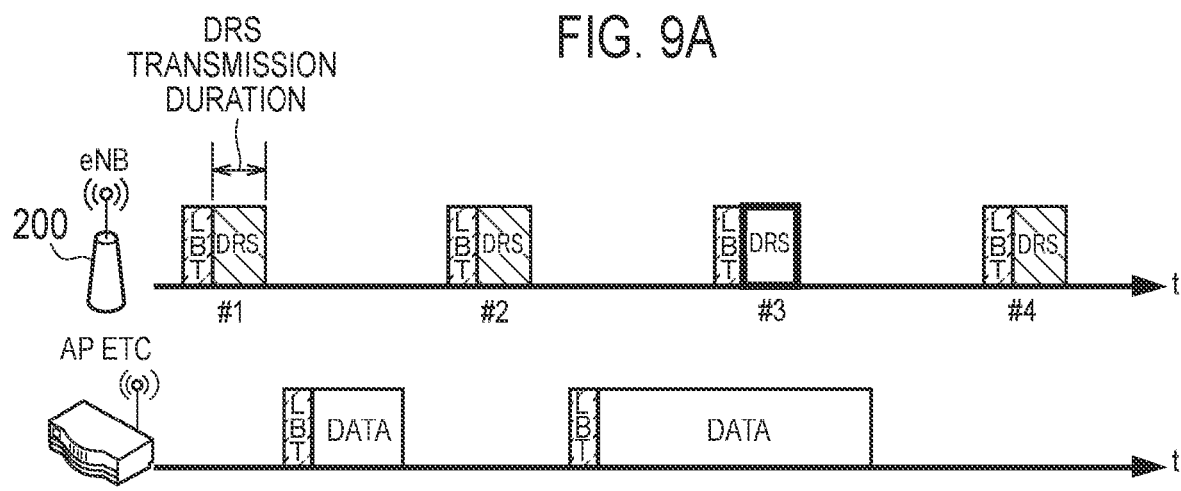
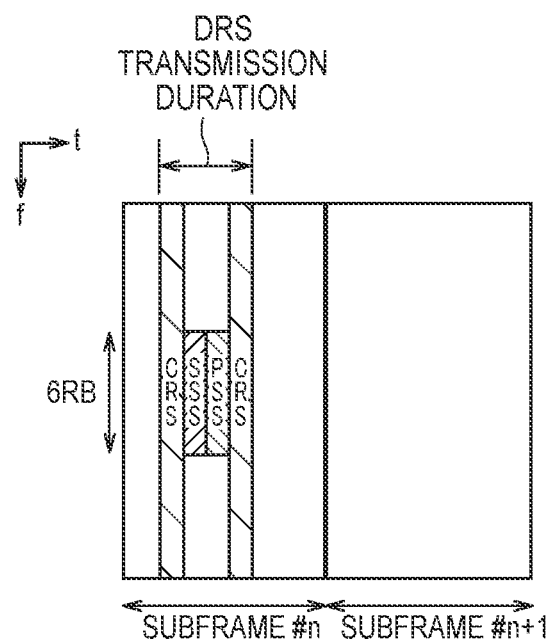
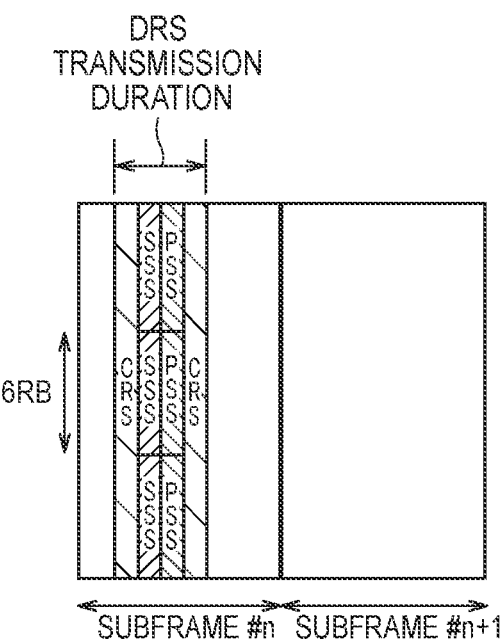

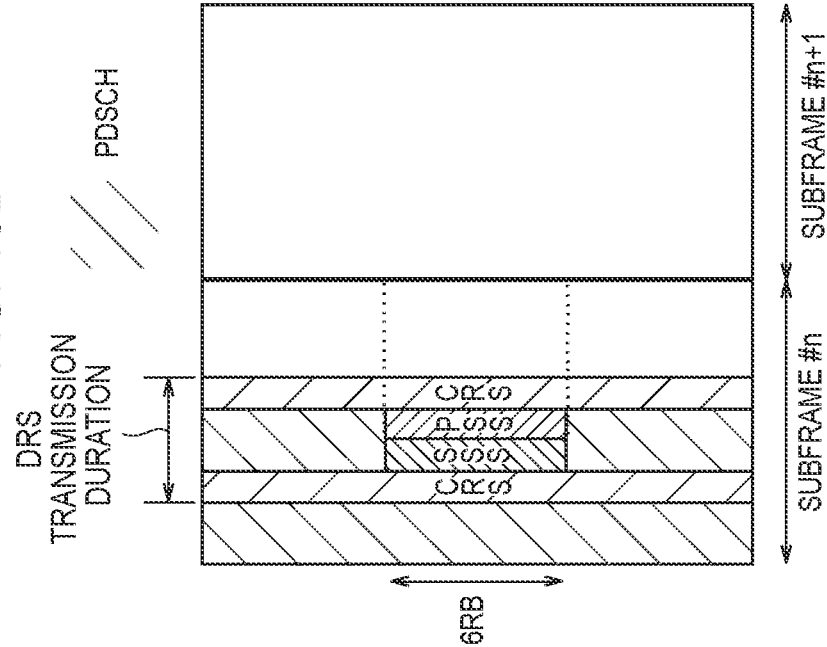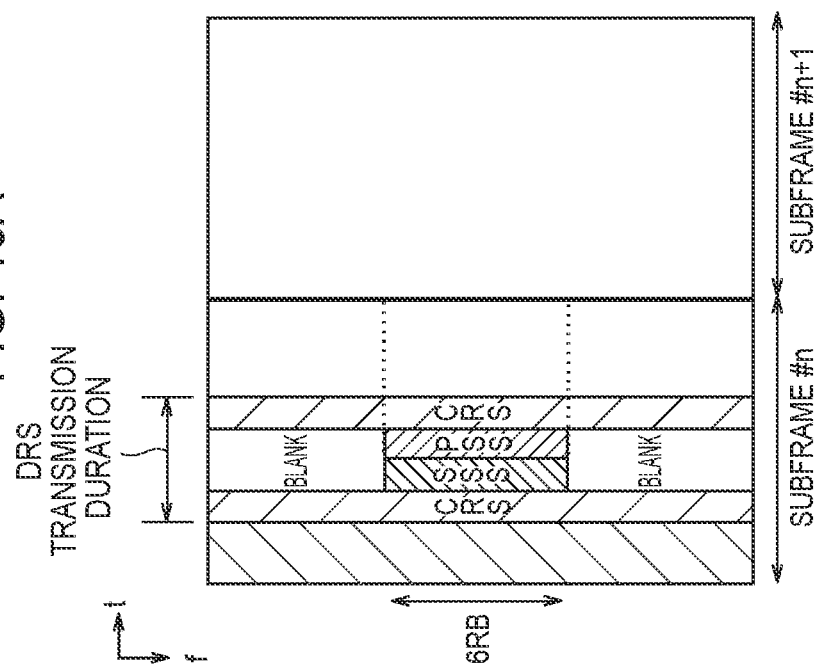

BASE STATION

CROSS-REFERENCE TO RELATED APPLICATION

The present application is a continuation based on PCT Application No. PCT/JP2016/077988 filed on Sep. 23, 2016, which claims the benefit of U.S. provisional application No. 62/232,862 (filed on Sep. 25, 2015). The content of which is incorporated by reference herein in their entirety.

FIELD

The present invention relates to a base station used in a mobile communication system.

BACKGROUND

In recent years, in order to meet rapidly increasing traffic demands in a mobile communication system, use of a specific frequency band shared by a plurality of operators and/or a plurality of communication systems for radio communication has been discussed. The specific frequency band is, for example, a frequency band not requiring a license (unlicensed band).

SUMMARY

A base station according to one embodiment comprises a controller configured to perform a process of transmitting, in a specific frequency band shared by a plurality of operators and/or a plurality of communication systems, a burst signal including data and a discovery reference signal including a reference signal and/or a synchronization signal. If there is a transmission duration of the discovery reference signal within a transmission duration of the burst signal after starting transmission of the burst signal, the controller performs a process of transmitting the discovery reference signal even within the transmission duration of the burst signal.

A base station according to one embodiment is a base station that can execute communication with a radio terminal in a licensed band and an unlicensed band. The base station comprises a controller configured to transmit, to the radio terminal, a physical downlink shared channel (PDSCH) and a discovery signal including a reference signal and a synchronization signal in the licensed band. The controller simultaneously performs transmission of the PDSCH and transmission of the discovery signal.

A base station according to one embodiment is a base station that can execute communication with a radio terminal in a licensed band and an unlicensed band. The base station comprises a controller configured to transmit, to the radio terminal, a physical downlink shared channel (PDSCH) and a discovery signal including a synchronization signal in the licensed band. The controller simultaneously performs transmission of the PDSCH and transmission of the discovery signal.

BRIEF DESCRIPTION OF THE DRAWINGS

FIGS. 9A to 9C are diagrams illustrating an example of an operation of transmitting a DRS.

FIGS. 15A and 15B are diagrams illustrating a case 2-3 according to the embodiment.

DESCRIPTION OF THE EMBODIMENT

Overview of Embodiment

Figure 1:
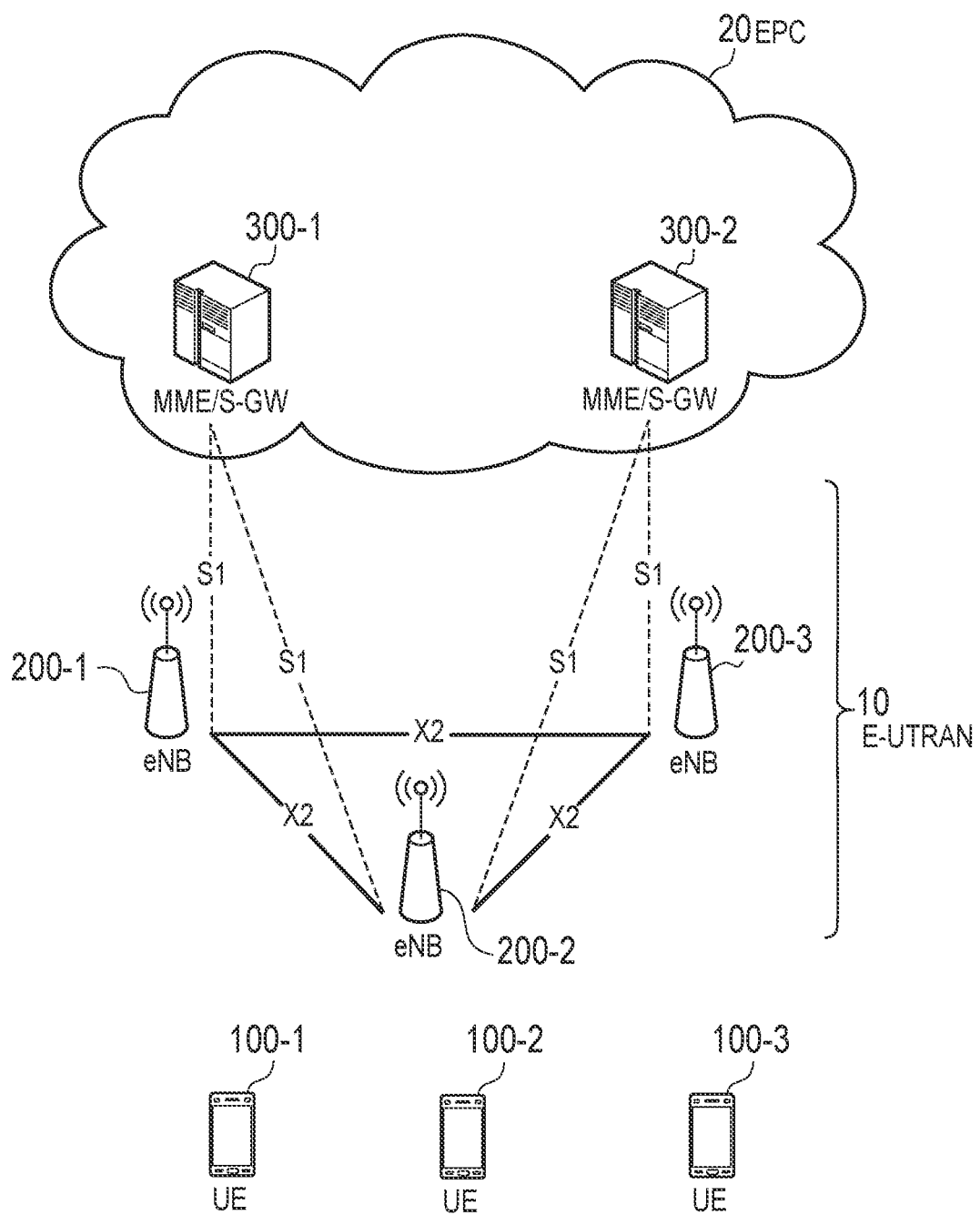
FIG. 1 is a diagram illustrating a configuration of an LTE system.

A base station according to the embodiment comprises a controller configured to perform a process of transmitting, in a specific frequency band shared by a plurality of operators and/or a plurality of communication systems, a burst signal including data and a discovery reference signal including a reference signal and/or a synchronization signal. If there is a transmission duration of the discovery reference signal within a transmission duration of the burst signal after starting transmission of the burst signal, the controller performs a process of transmitting the discovery reference signal even within the transmission duration of the burst signal.

The controller performs a process of transmitting, to a radio terminal to which the burst signal is transmitted, information indicating that the discovery reference signal is included within the transmission duration of the burst signal.

If the discovery reference signal is transmitted within the transmission duration of the burst signal, the controller arranges the burst signal in an available resource in which the discovery reference signal is not arranged, among radio resources within the transmission duration of the discovery reference signal.

The specific frequency band is a frequency band required to perform a determination process for determining whether or not the specific frequency band is available before transmitting a radio signal by using the specific frequency band. If the discovery reference signal is transmitted within the transmission duration of the burst signal, the controller omits the determination process for transmitting the discovery reference signal.

The controller performs a process of transmitting the burst signal and the discovery reference signal by using an identical antenna port so that the reference signal included in the discovery reference signal functions as a demodulation reference signal.

The controller determines, based on priority information, whether or not to prioritize the transmission of the discovery reference signal over the transmission of the burst signal; and if determining to prioritize the transmission of the burst signal over the transmission of the discovery reference signal, cancels the transmission of the discovery reference signal.

A base station according to the embodiment is a base station that can execute communication with a radio terminal in a licensed band and an unlicensed band. The base station comprises a controller configured to transmit, to the radio terminal, a physical downlink shared channel (PDSCH) and a discovery signal including a reference signal and a synchronization signal in the licensed band. The controller simultaneously performs transmission of the PDSCH and transmission of the discovery signal.

A base station according to the embodiment is a base station that can execute communication with a radio terminal in a licensed band and an unlicensed band. The base station comprises a controller configured to transmit, to the radio terminal, a physical downlink shared channel (PDSCH) and a discovery signal including a synchronization signal in the licensed band. The controller simultaneously performs transmission of the PDSCH and transmission of the discovery signal.

A base station according to the embodiment comprises controller configured to perform a process of transmitting, in a specific frequency band shared by a plurality of operators and/or a plurality of communication systems, a burst signal including data and a discovery reference signal including a reference signal and/or a synchronization signal. If a transmission start timing of the burst signal and a transmission start timing of the discovery reference signal collide, the controller prioritizes transmission of the discovery reference signal and starts transmission of the burst signal after the transmission of the discovery reference signal ends.

The controller transmits a predetermined signal indicating a start of the transmission of the burst signal within a transmission duration of the discovery reference signal.

The controller uses the synchronization signal included in the discovery reference signal as the predetermined signal.

If there is a vacant time from an end of the transmission of the discovery reference signal up to a start of the transmission of the burst signal, the controller performs a process of transmitting a reservation signal for occupying a resource of the specific frequency band within the vacant time.

The controller determines a transmission end timing of the burst signal so that a time from the start of the transmission of the discovery reference signal up to the end of the transmission of the burst signal does not exceed a maximum burst transmission duration.

The controller performs a process of transmitting the burst signal and the discovery reference signal by using an identical antenna port so that the reference signal included in the discovery reference signal functions as a demodulation reference signal.

A base station according to the embodiment comprises: controller configured to perform a process of transmitting, in a specific frequency band shared by a plurality of operators and/or a plurality of communication systems, a burst signal including data and a discovery reference signal including a reference signal and/or a synchronization signal. If a transmission start timing of the burst signal and a transmission start timing of the discovery reference signal collide, the controller determines, based on priority information, which one of the transmission of the burst signal and the transmission of the discovery reference signal is prioritized.

If determining to prioritize the transmission of the discovery reference signal over the transmission of the burst signal, the controller performs a process of only transmitting the discovery reference signal.

If determining to prioritize the transmission of the burst signal over the transmission of the discovery reference signal, the controller performs a process of only transmitting the burst signal.

The priority information is information based on a transmission frequency of the discovery reference signal.

A base station according to the embodiment comprises a controller configured to perform a process of transmitting, in a specific frequency band shared by a plurality of operators and/or a plurality of communication systems, a burst signal including data and a discovery reference signal including a reference signal and/or a synchronization signal. If a transmission start timing of the burst signal and a transmission start timing of the discovery reference signal collide, the controller arranges the burst signal in an available resource in which the discovery reference signal is not arranged among radio resources within a transmission duration of the discovery reference signal.

The controller transmits information indicating that the burst signal is arranged in the available resource within the transmission duration of the discovery reference signal.

The controller transmits information indicating that the burst signal is arranged in the available resource out of the transmission duration of the discovery reference signal.

A base station according to the embodiment comprises a controller configured to perform a process of transmitting, in a specific frequency band shared by a plurality of operators and/or a plurality of communication systems, a burst signal including data and a discovery reference signal including a reference signal and/or a synchronization signal. If there is a transmission duration of the discovery reference signal when a transmission duration of the burst signal reaches a maximum burst transmission duration, the controller performs a process of transmitting the discovery reference signal at a last part within the transmission duration of the burst signal.

A base station according to the embodiment comprises a controller configured to perform a process of transmitting, in a specific frequency band shared by a plurality of operators and/or a plurality of communication systems, a burst signal including data and a discovery reference signal including a reference signal and/or a synchronization signal. If a last part of a transmission duration of the burst signal and a transmission preparation duration of the discovery reference signal collide, the controller stops the transmission of the burst signal at the last part so to secure the transmission preparation duration.

The specific frequency band is a frequency band required to perform a determination process for determining whether or not the specific frequency band is available before transmitting a radio signal by using the specific frequency band. The transmission preparation duration is a duration for performing the determination process for transmitting the discovery reference signal.

The controller performs a process of transmitting, to a radio terminal to which the burst signal is transmitted, information indicating a transmission stop of the burst signal at the last part.

A radio terminal according to the embodiment comprises a controller configured to perform a process of receiving, in a specific frequency band shared by a plurality of operators and/or a plurality of communication systems, a burst signal including data and a discovery reference signal including a reference signal and/or a synchronization signal. If receiving a predetermined signal transmitted by a base station within a transmission duration of the discovery reference signal, the controller determines, based on the predetermined signal, to start a reception of the burst signal after the reception of the discovery reference signal ends. The predetermined signal is a signal that indicates a start of transmission of the burst signal.

A radio terminal according to the embodiment comprises a controller configured to perform a process of receiving, in a specific frequency band shared by a plurality of operators and/or a plurality of communication systems, a burst signal including data and a discovery reference signal including a reference signal and/or a synchronization signal. If receiving, from a base station, information indicating that the burst signal is arranged in an available resource in which the discovery reference signal is not arranged, among radio resources within a transmission duration of the discovery reference signal, the controller determines, based on the information, that the burst signal is arranged in the available resource.

A radio terminal according to the embodiment comprises a controller configured to perform a process of receiving, in a specific frequency band shared by a plurality of operators and/or a plurality of communication systems, a burst signal including data and a discovery reference signal including a reference signal and/or a synchronization signal. If receiving, from a base station, information indicating that the discovery reference signal is included within a transmission duration of the burst signal after a start of transmission of the burst signal, the controller determines, based on the information, that the discovery reference signal is included within the transmission duration of the burst signal.

Embodiment

Hereinafter, a mobile communication system according to the embodiment will be described. The mobile communication system according to the embodiment is an LTE (Long Term Evolution) system whose specifications are defined in 3rd Generation Partnership Project (3GPP).

(LTE System)

First, the system configuration of the LTE system will be described. FIG. 1 is a diagram showing a configuration of an LTE system.

As illustrated in FIG. 1, the LTE system comprises UEs (User Equipments) 100, E-UTRAN (Evolved-UMTS Terrestrial Radio Access Network) 10, and EPC (Evolved Packet Core) 20.

The UE 100 corresponds to the radio terminal. The UE 100 is a mobile communication apparatus and performs radio communication with a cell (a serving cell). Configuration of UE 100 will be described later.

The E-UTRAN 10 corresponds to a radio access network. The E-UTRAN 10 includes a plurality of eNBs 200 (evolved Node-Bs). The eNB 200 corresponds to a base station. The eNBs 200 are connected mutually via an X2 interface. Configuration of eNB 200 will be described later.

The eNB 200 manages one cell or a plurality of cells and performs radio communication with the UE 100 that establishes a connection with the cell. The eNB 200 has a radio resource management (RRM) function, a routing function of user data (hereinafter, simply referred to as "data"), and a measurement control function for mobility control and scheduling and the like. The "cell" is used as a term indicating a minimum unit of a radio communication area, and is also used as a term indicating a function of performing radio communication with the UE 100.

The EPC 20 corresponds to a core network. The EPC 20 includes MMEs (Mobility Management Entities)/S-GWs (Serving-Gateways) 300. The MME performs various mobility controls and the like, for the UE 100. The S-GW performs transfer control of data. The MME/S-GW 300 is connected to the eNB 200 via an S1 interface. The E-UTRAN 10 and the EPC 20 constitute a network.

Figure 2:
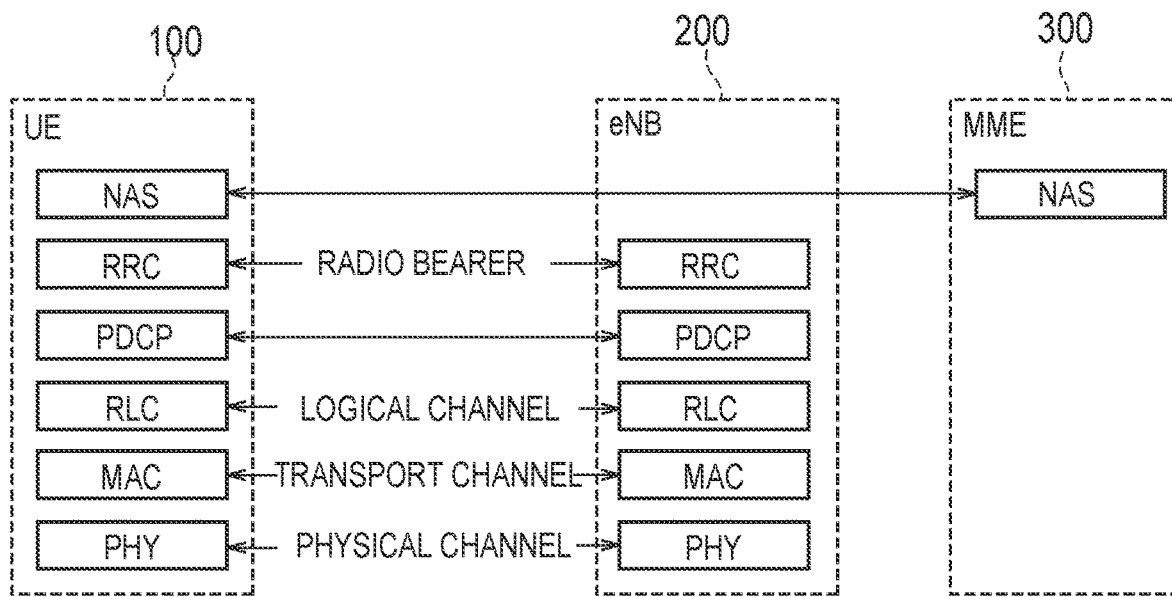
FIG. 2 is a protocol stack diagram of a radio interface in the LTE system.
Figure 4:
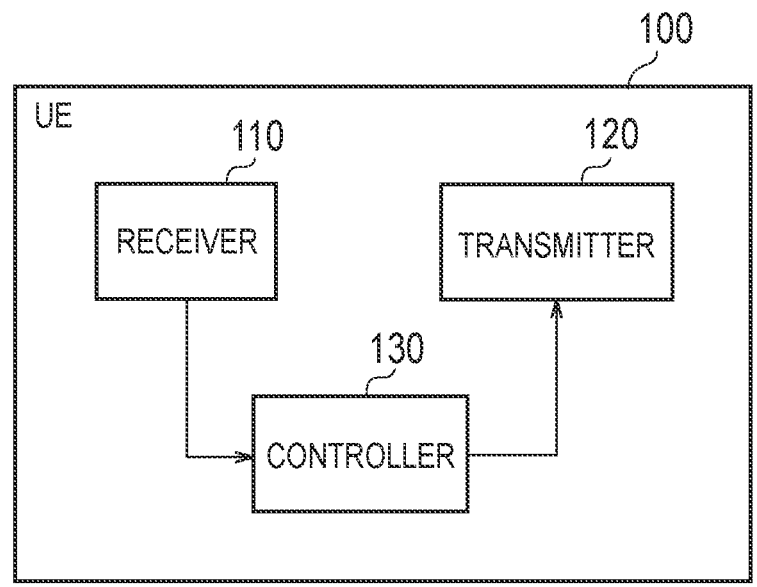
FIG. 4 is a block diagram of a UE.

FIG. 2 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted through the physical channel.

The MAC layer performs preferential control of data, a retransmission process by hybrid ARQ (HARQ), a random access procedure, and the like. Between the MAC layer of the UE 100 and the MAC layer of the eNB 200, data and control signal are transmitted via a transport channel. The MAC layer of the eNB 200 includes a scheduler for determining a transport format of an uplink and a downlink (a transport block size, a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane which treats the control signal. Between the RRC layer of the UE 100 and the RRC layer of the eNB 200, a message (an RRC message) for various types of configurations is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in a RRC connected state, and when the RRC connection is not established, the UE 100 is in an RRC idle state.

A NAS (Non-Access Stratum) layer positioned above the RRC layer performs session management and mobility management, for example.

Figure 3:
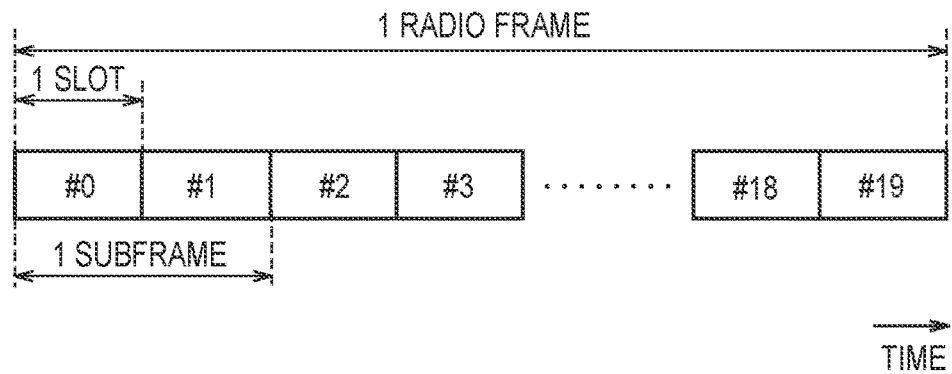
FIG. 3 is a configuration diagram of a radio frame used in the LTE system.

FIG. 3 is a configuration diagram of a radio frame used in the LTE system. In the LTE system, OFDMA (Orthogonal Frequency Division Multiplexing Access) is applied in a downlink, and SC-FDMA (Single Carrier Frequency Division Multiple Access) is applied in an uplink, respectively.

As illustrated in FIG. 3, the radio frame (system frame) is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. A radio resource element (RE) is configured by one subcarrier and one symbol. Among radio resources assigned to the UE 100, a frequency resource can be specified by a resource block and a time resource can be specified by a subframe (or slot).

In the downlink, an interval of several symbols at the head of each subframe is a region mainly used as a physical downlink control channel (PDCCH) for transmission of a downlink control signal. Details of the PDCCH will be described below. Furthermore, the remaining part of each subframe is a region mainly used as a physical downlink shared channel (PDSCH) for transmission of a downlink data.

In the uplink, both end portions in the frequency direction of each subframe are regions mainly used as a physical uplink control channel (PUCCH) for transmission of an uplink control signal. Furthermore, the center portion in the frequency direction of each subframe is a region that can be mainly used as a physical uplink shared channel (PUSCH) for transmission of an uplink data. In each subframe, an uplink reference signal such as a sounding reference signal (SRS) is arranged.

(Configuration of Radio Terminal)

The UE 100 (radio terminal) according to the first embodiment will be described below. FIG. 4 is a block diagram illustrating a configuration of the UE 100. As illustrated in FIG. 4, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (reception signal), and outputs the baseband signal to the controller 130. The receiver 110 may include a first receiver unit configured to receive ae radio signal in the licensed band, and a second receiver unit configured to receive a radio signal in the unlicensed band.

The transmitter 120 performs various types of transmissions under the control of the controller 130. The transmitter 120 includes an antenna and a transmitter unit. The transmitter unit converts a baseband signal (transmission signal) output from the controller 130 into a radio signal, and transmits the radio signal from the antenna. The transmitter 120 may include a first transmitter unit configured to transmit a radio signal in the licensed band, and a second transmitter unit configured to transmit a radio signal in the unlicensed band.

The controller 130 performs various types of controls in the UE 100. The controller 130 includes a processor and a memory. The memory stores a program executed by the processor, and information used for a process by the processor. The processor includes a baseband processor configured to perform modulation and demodulation, encoding and decoding and the like on the baseband signal, and a CPU (Central Processing Unit) configured to execute the program stored in the memory to perform various types of processes. The processor may include a codec configured to perform encoding and decoding on sound and video signals. The processor executes various types of processes described later, and various types of communication protocols described above.

(Configuration of Base Station)

Figure 5:
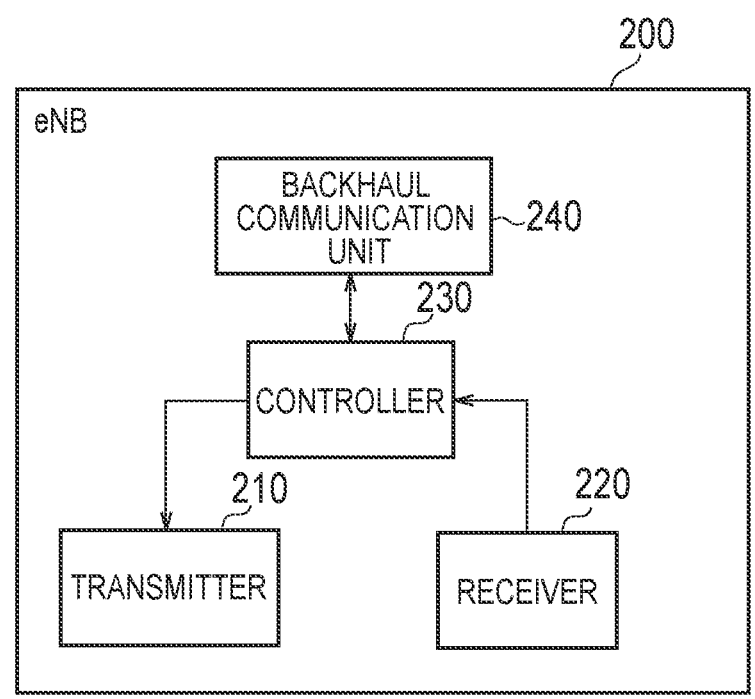
FIG. 5 is a block diagram of an eNB.

A configuration of the eNB 200 (base station) will be described, below. FIG. 5 is a block diagram of the eNB 200. As illustrated in FIG. 5, the eNB 200 includes: a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmission signal) output from the controller 230 into a radio signal, and transmits the radio signal from the antenna. The transmitter 210 may include a first transmitter unit configured to transmit a radio signal in the licensed band, and a second transmitter unit configured to transmit a radio signal in the unlicensed band.

The receiver 220 performs various types of receptions under the control of the controller 230. The receiver 220 includes an antenna and a receiver unit. The receiver unit converts a radio signal received by the antenna into a baseband signal (reception signal), and outputs the baseband signal to the controller 230. The receiver 220 may include a first receiver unit configured to receive a radio signal in the licensed band, and a second receiver unit configured to receive a radio signal in the unlicensed band.

The controller 230 performs various types of controls in the eNB 200. The controller 230 includes a processor and a memory. The memory stores a program executed by the processor, and information used for a process by the processor. The processor includes a baseband processor configured to perform modulation and demodulation, encoding and decoding and the like on the baseband signal, and a CPU (Central Processing Unit) configured to execute the program stored in the memory to perform various types of processes. The processor executes various types of processes described later, and various types of communication protocols described above.

The backhaul communication unit 240 is connected to a neighboring eNB 200 via the X2 interface and to the MME/S-GW 300 via the S1 interface. The backhaul communication unit 240 is used for communication performed on the X2 interface and communication performed on the S1 interface and the like.

(LAA)

LAA (Licensed-Assisted Access) will be described, below. The eNB 200 according to the embodiment performs radio communication with the UE 100 in a specific frequency band shared by a plurality of operators and/or a plurality of communication systems. In the embodiment, the specific frequency band is an unlicensed band.

The LTE system according to the embodiment uses, for LTE communication, not only a licensed band for which the license is granted to operators, but also an unlicensed band for which the license is not required. Specifically, with an aid of the licensed band, it is possible for the UE 100 to access the unlicensed band. Such a way is referred to as the LAA.

Figure 6:
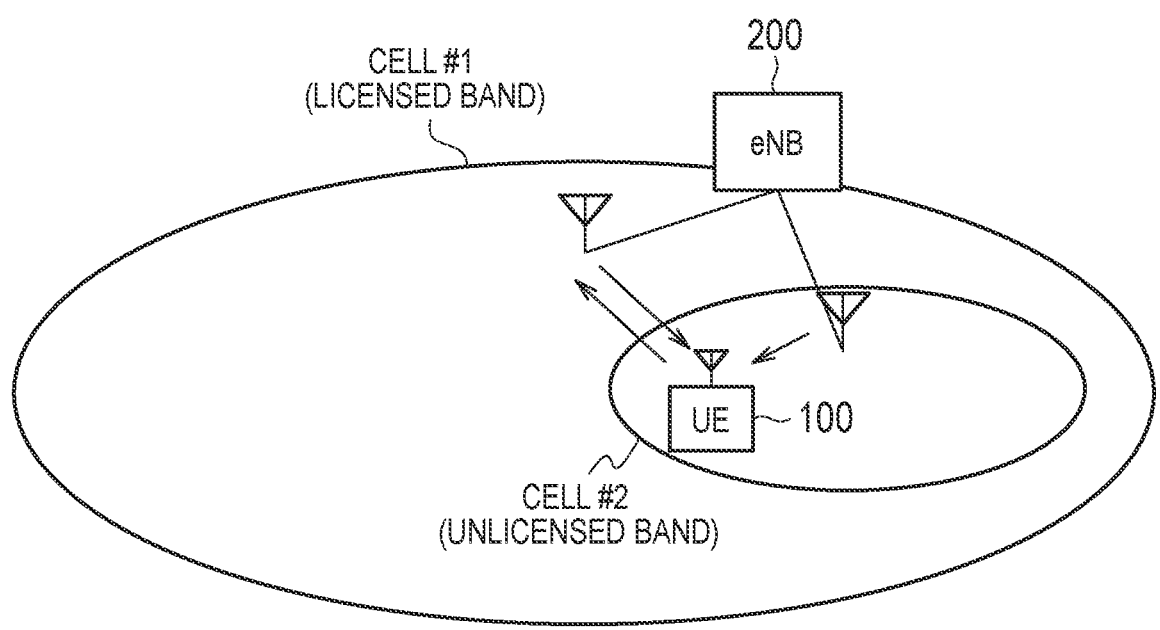
FIG. 6 is a diagram for describing an LAA.

FIG. 6 is a diagram for describing the LAA. As illustrated in FIG. 6, the eNB 200 manages a cell #1 operated in a licensed band and a cell #2 operated in an unlicensed band. In FIG. 6, an example is illustrated where the cell #1 is a macro cell and the cell #2 is a micro cell, but a cell size is not limited to this.

The UE 100 is located in an overlapping area of the cell #1 and the cell #2. The UE 100 sets the cell #1 as a primary cell (PCell), while setting the cell #2 as a secondary cell (SCell) and performs communication by carrier aggregation (CA).

In an example of FIG. 6, the UE 100 performs uplink communication and downlink communication with the cell #1 and downlink communication with the cell #2. By such carrier aggregation, the UE 100 is provided, with a radio resource of the unlicensed band, in addition to with a radio resource of the licensed band, and thus the UE 100 can improve downlink throughput.

In the unlicensed band, in order to avoid interference with a communication system (such as wireless LAN) different from an LTE system or an LTE system of another operator, a determination process referred to as listen-before-talk (LBT) is requested. The LBT is a process in which it is confirmed, based on received power, whether or not a frequency channel is idle, and only if it is confirmed that the frequency channel is a clear channel, the frequency channel is used.

The eNB 200 seeks a clear channel in the cell #2 (unlicensed band), and allocates a radio resource included in the clear channel to the UE 100 by the LBT (scheduling). The eNB 200 performs scheduling in the cell #2 via PDCCH of the cell #2 (that is, self-scheduling). Alternatively, the eNB 200 may perform scheduling in the cell #2 via PDCCH of the cell #1 (that is, cross-carrier scheduling).

(LBT)

The LBT will be described, below. The LBT has two schemes, a Frame Based Equipment (FBE) scheme and a Load Based Equipment (LBE) scheme. The FBE scheme is a scheme in which a timing is fixed. Meanwhile, a timing is not fixed in the LBE scheme.

Figure 7:
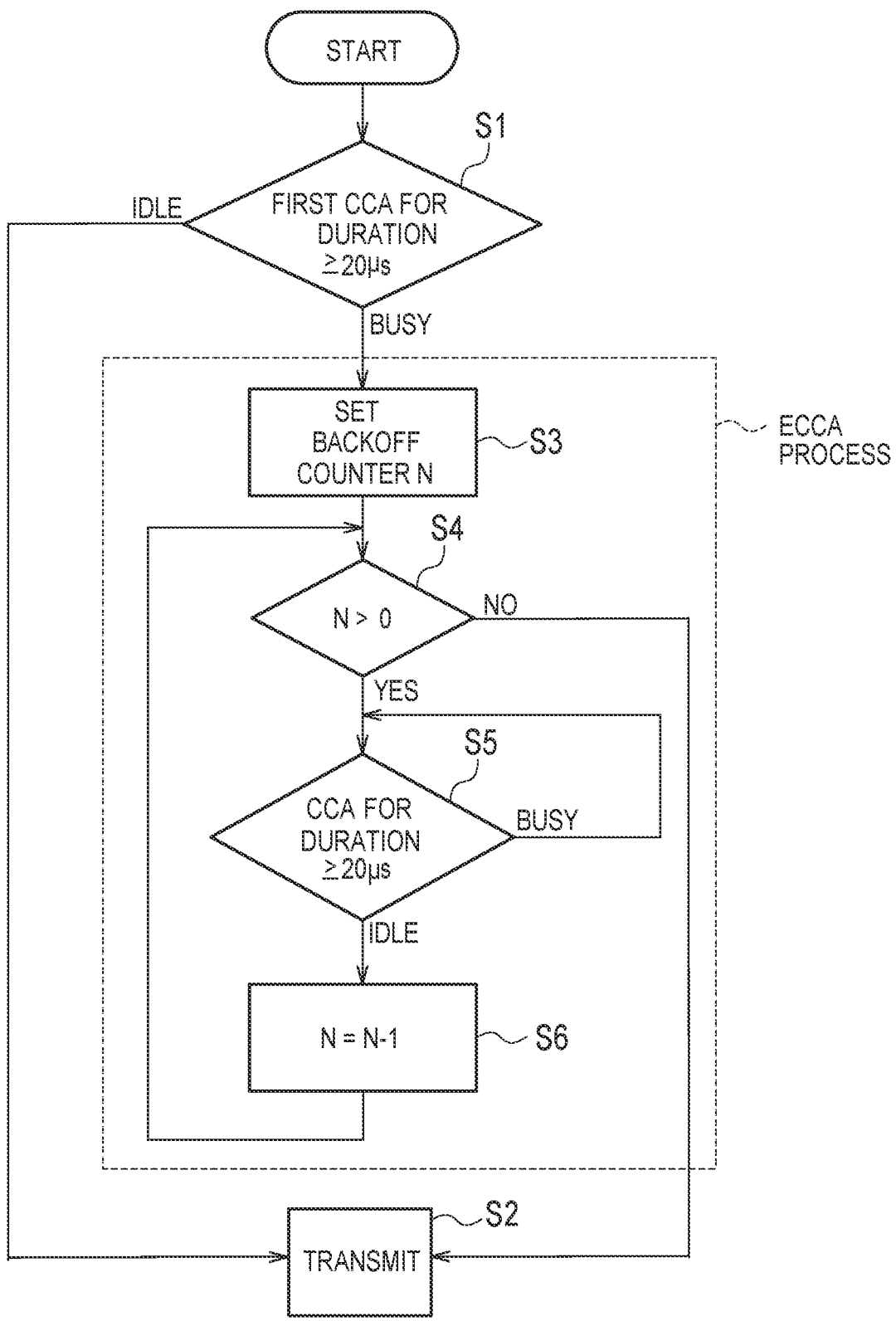
FIG. 7 is a flow chart illustrating an example of LBE-based LBT.

FIG. 7 is a flow chart illustrating an example of the LBE-based LBT.

As illustrated in FIG. 7, the eNB 200 monitors a target channel in an unlicensed band and determines, based on a received signal strength (interference power), whether or not the target channel is idle (step S1). Such determination is referred to as Clear Channel Assessment (CCA). Specifically, if a state where the detected power is larger than a threshold value continues for a certain period (for example, 20 μs or more), the eNB 200 determines that the target channel is busy. Otherwise, the eNB 200 determines that the target channel is idle, and starts transmission (step S2).

As a result of such an initial CCA, if the target channel is determined to be busy, the eNB 200 transitions to an Extended Clear Channel Assessment (ECCA) process. In the ECCA process, the eNB 200 sets a counter (N) where the initial value is N (step S3). N is a random number from 4 to 32. The UE 100 decrements N (that is, subtracts 1) each time the CCA is successful (step S5 and step S6). Upon N reaching 0 (step S4: No), the eNB 200 determines that the target channel is idle and starts transmission (step S2).

(Burst Signal)

A burst signal will be described, below. If the LBT is successful (that is, if the target channel is determined to be idle), the eNB 200 transmits the burst signal including data (PDSCH). The eNB 200 may continuously transmit the burst signal over a plurality of subframes. The burst signal may include a control signal (PDCCH) in addition to the data (PDSCH). Furthermore, the burst signal may include an initial signal.

Figure 8:
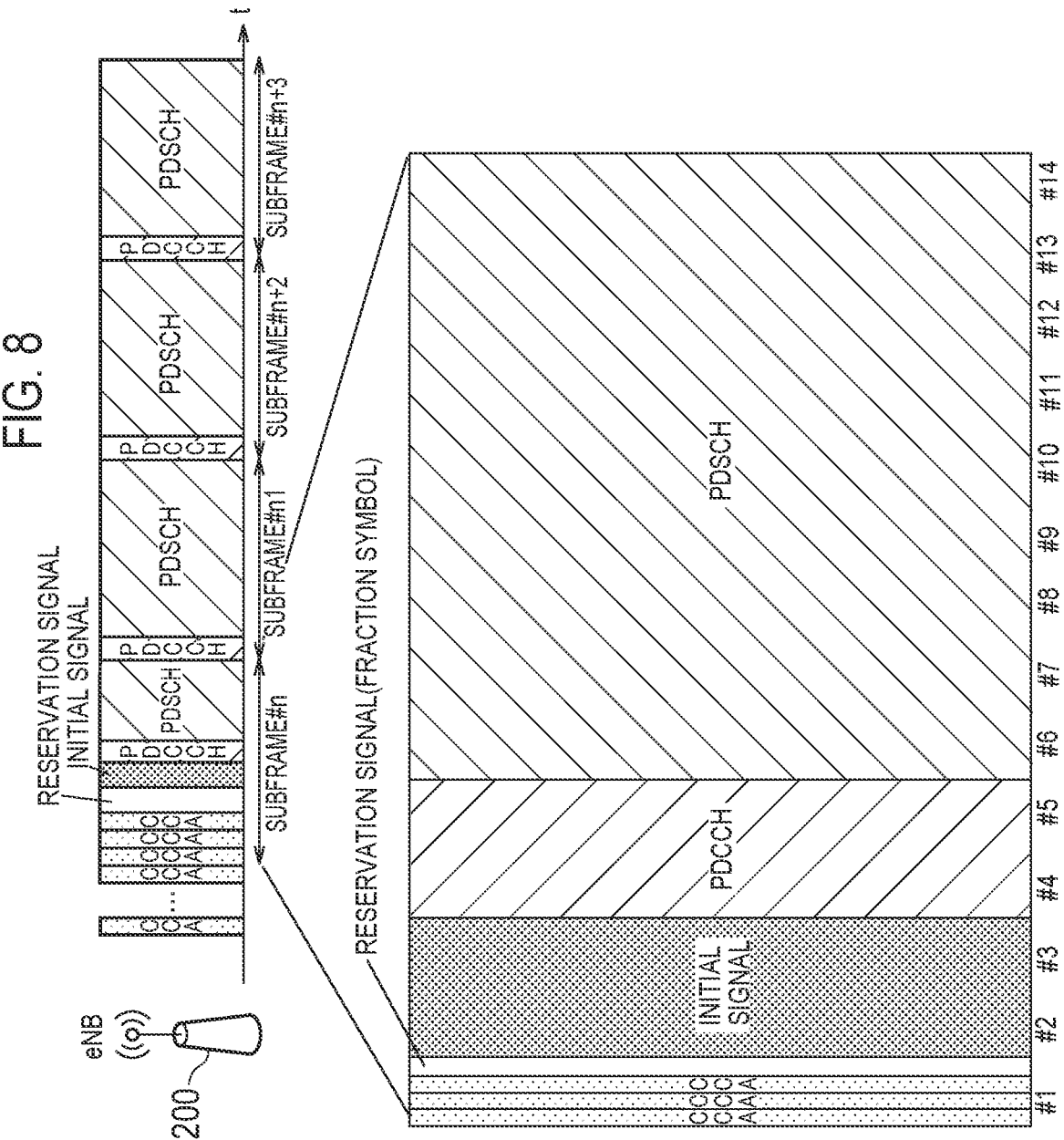
FIG. 8 is a diagram illustrating an example of an operation of transmitting a burst signal.

FIG. 8 is a diagram illustrating an example of an operation of transmitting a burst signal. Here, a case is assumed that the LBE scheme is applied to the LBT for the burst signal.

As illustrated in FIG. 8, the eNB 200 starts transmission of the burst signal after successfully performing the LBT. In FIG. 8, an example is illustrated in which the eNB 200 transmits a burst signal within a duration from a subframe # n up to a subframe # n+3.

Furthermore, in FIG. 8, the eNB 200 successfully performs the LBT anywhere in a symbol interval #1 being the head of the subframe # n. In this case, the eNB 200 performs the transmission in the order of a reservation signal, an initial signal, a control signal (PDCCH), and data (PDSCH).

The reservation signal is a signal for occupying the target channel up to a point of starting the next symbol interval, so that another device does not interrupt the target channel if the last CCA completion of the LBT is anywhere in the symbol interval. The reservation signal, for example, may be used as a cyclic prefix (CP) of the initial signal.

The initial signal is a signal for indicating, to the UE 100, a start of the transmission of the burst signal. In FIG. 8, the initial signal has a time length of two symbol intervals. However, the initial signal may be a time length of one symbol interval. The initial signal may include a primary synchronization signal (PSS) and a secondary synchronization signal (SSS).

The PDCCH carries downlink control information (DCI) including downlink scheduling information indicating an allocation of downlink resources (resource blocks and the like). In order to identify a UE 100 to which the DCI is transmitted, the eNB 200 includes a CRC bit scrambled with an identifier (Radio Network Temporary ID (RNTI)) of the UE 100 to which the DCI is transmitted, into the DCI. Each UE 100 performs blind decoding of the PDCCH for the DCI that may be addressed to the UE 100 to detect the DCI addressed to the UE 100. However, if a cross-carrier scheduling is used, the burst signal may not include the control signal (PDCCH).

The PDSCH carries the data by the downlink radio resource (resource block) indicated by the downlink scheduling information.

(Discovery Reference Signal)

A discovery reference signal (DRS) will be described, below. The DRS includes a reference signal and/or a synchronization signal. Unlike the burst signal transmitted to one UE 100, the DRS is a signal common to a plurality of UEs 100 in a cell of the eNB 200.

The reference signal includes a cell-specific reference signal (CRS). The reference signal may include a channel state information reference signal (CSI-RS). The synchronization signal includes a primary synchronization signal (PSS) and a secondary synchronization signal (SSS).

FIGS. 9A to 9C are diagrams illustrating an example of an operation of transmitting a DRS.

As illustrated in FIGS. 9A to 9C, if the LBT is successful (that is, if the target channel is determined to be idle), the eNB 200 transmits the DRS. In the example illustrated in FIG. 9A, a transmission occasion of the DRS (DRS Occasion) periodically occurs. Furthermore, the eNB 200 fails to perform the LBT by detecting a signal of another device (for example, a radio LAN AP) in the LBT for a third DRS transmission (#3) and cancels the third DRS transmission. The eNB 200 successfully performs the LBT for other DRS transmissions (#1, #2, and #4) and performs the DRS transmission within a DRS transmission duration.

In the embodiment, the eNB 200 performs the LBT for the DRS independently from the LBT for the burst signal. The LBE scheme may be applied to the LBT for the DRS or the FBE scheme may be applied to the LBT for the DRS. However, the eNB 200 stops the LBT for the burst signal during the DRS transmission.

As illustrated in FIG. 9B, the DRS is arranged at a certain symbol position within a subframe. It is noted that the number of the subframe in which the DRS is arranged can be changed.

In an example illustrated in FIG. 9B, the DRS is configured by a CRS, a PSS, and an SSS. Specifically, the DRS transmission duration has a time length equivalent to four symbol intervals.

The CRS is arranged in the symbol intervals at the beginning and at the end of the DRS transmission duration. The CRS is intermittently arranged over an entire frequency band in the frequency direction. The CRS is a signal used by the UE 100 for downlink RRM measurement and the like.

The PSS and the SSS are arranged in two central symbol intervals in the DRS transmission duration. The PSS and the SSS are signals used by the UE 100 for performing cell search and the like. The PSS and the SSS are arranged in the frequency band equivalent to six central resource blocks in the frequency direction. As illustrated in FIG. 9C, the PSS and the SSS may be repeatedly arranged in the frequency direction.

Operation According to Embodiment

As described above, the eNB 200 independently performs the LBT for the burst signal and the LBT for the DRS in an unlicensed band. Thus, a transmission duration of the burst signal and a transmission duration of the DRS may collide.

Specifically, if a timing at which the LBT for the burst signal is successful and a timing at which the LBT for the DRS is successful are the same (or if a counter of the LBT for the burst signal and a counter of the LBT for the DRS simultaneously satisfy the condition), a transmission start timing of the burst signal and a transmission start timing of the DRS collide. Hereinafter, such a case is referred to as a case 1.

Furthermore, there may be a DRS transmission duration (DRS Occasion) within the burst signal transmission duration (or upon the DRS transmission start timing arriving within the burst signal transmission duration, the burst signal transmission duration and the DRS transmission duration may overlap). Hereinafter, such a case is referred to as a case 2.

Furthermore, in addition to a case where the burst signal transmission duration and the DRS transmission duration collide, the burst signal transmission duration and a DRS transmission preparation duration may collide. The DRS transmission preparation duration is a duration in which a determination process (LBT) for transmitting the DRS is performed. Hereinafter, such a case is referred to as a case 3. It is noted that in the case 3, the DRS transmission start timing is out of the burst signal transmission duration.

In the embodiment, if the burst signal transmission duration collides with the DRS transmission duration or the transmission preparation duration in the unlicensed band, the eNB 200 performs a process of prioritizing DRS transmission over the burst signal transmission. As a result, for cells being operated in the unlicensed band, a plurality of UEs 100 can use the DRS to smoothly perform a cell search and/or RRM measurement and the like.

However, if the transmission of the DRS is continuously successful within a past certain period (that is, if the transmission frequency of the DRS is high), for example, the eNB 200 determines that the present transmission of the DRS is not required and may prioritize the transmission of the burst signal over the transmission of the DRS.

(1) Case 1

Figure 10:
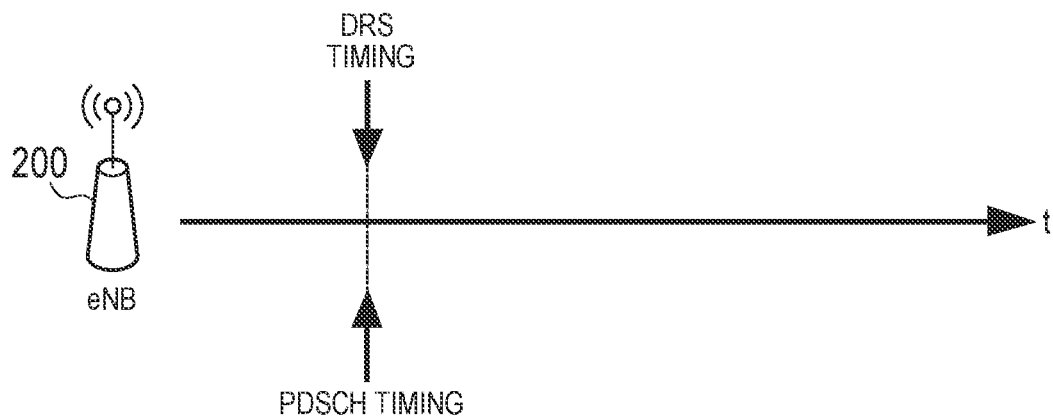
FIG. 10 is a diagram illustrating a case 1 according to an embodiment.

The case 1 will be described, below. FIG. 10 is a diagram illustrating the case 1.

As illustrated in FIG. 10, in the case 1, the eNB 200 successfully performs the LBT for the burst signal and the LBT for the DRS at the same timing. In this case, the transmission start timing of the burst signal (PDSCH timing) and the transmission start timing of the DRS (DRS timing) collide. It is noted that a case where the transmission start timing of the burst signal and the transmission start timing of the DRS collide may occur even in cases other than a case where the eNB 200 successfully performs the LBT for the burst signal and the LBT for the DRS at the same timing.

It should be noted that although the burst signal is indicated as PDSCH in the figures below, the burst signal may include not only the PDSCH but also an initial signal and/or PDCCH.

(1.1) Case 1-1

Figure 11:
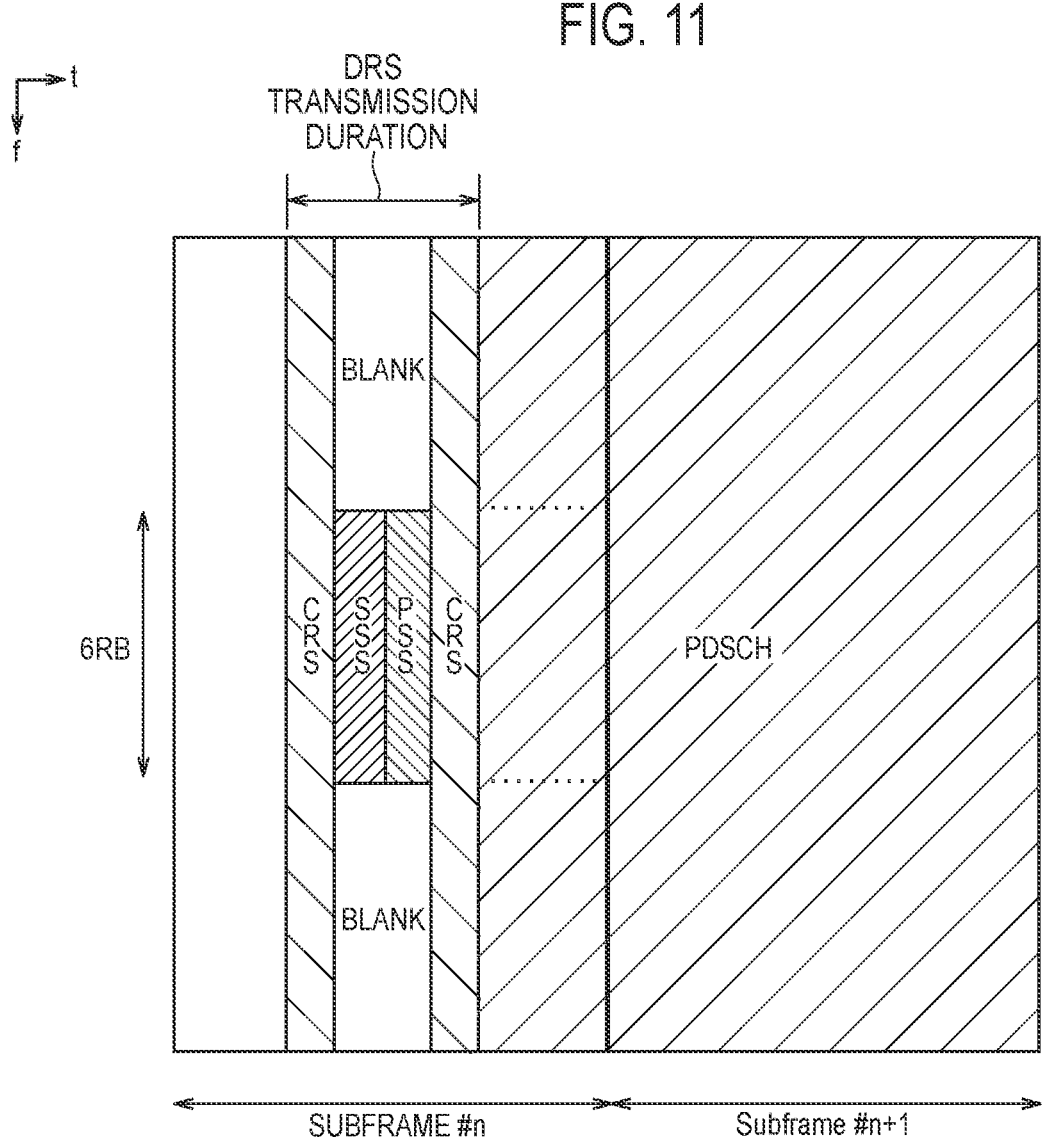
FIG. 11 is a diagram illustrating a case 1-1 according to the embodiment.

First, a case 1-1 will be described. FIG. 11 is a diagram illustrating the case 1-1.

As illustrated in FIG. 11, if the transmission start timing of the burst signal and the transmission start timing of the DRS collide, the eNB 200 prioritizes the transmission of the DRS and starts the transmission of the burst signal after the transmission of the DRS ends. As a result, the DRS is preferentially transmitted and the burst signal can also be transmitted.

In an example illustrated in FIG. 11, the eNB 200 starts transmission of the burst signal from a symbol interval next to the last symbol interval of the DRS transmission duration. That is, the eNB 200 sets the burst signal transmission duration continuously to the DRS transmission duration. However, the eNB 200 may provide a gap between the DRS transmission duration and the burst signal transmission duration.

Furthermore, the eNB 200 may transmit a predetermined signal (initial signal) indicating the start of the transmission of the burst signal within the DRS transmission duration. As a result, the UE 100 can start a reception of the burst signal, based on the predetermined signal (initial signal).

The eNB 200 may use the synchronization signal (PSS and/or SSS) included in the DRS as the initial signal. In this case, the eNB 200 may apply a special signal sequence or a special resource arrangement pattern and the like to the synchronization signal used as the initial signal. The gap between the symbol interval of the synchronization signal used as the initial signal and the symbol interval at which the transmission of the burst signal is started may be prescribed in advance based on a system specification. Alternatively, the synchronization signal may include information indicating the gap.

Alternatively the eNB 200 may arrange the predetermined signal indicating the start of the transmission of the burst signal in an available resource in which the DRS is not arranged among the radio resources (resource elements) within the DRS transmission duration. The available resource is a resource element outside the PSS and the SSS in the frequency direction (a "Blank" region in FIG. 11), for example. Alternatively, the available resource may be a resource element in which the CRS is not arranged within the CRS symbol interval. The predetermined signal arranged in the available resource may be the above-described initial signal or a determination signal. The determination signal may be a signal having binary information indicating whether or not the burst signal is transmitted after transmitting the DRS. The determination signal may be prescribed as a part of the DRS. Alternatively, the eNB 200 may use a signal sequence or a resource arrangement pattern of the PSS/SSS/CRS included in the DRS to implicitly transmit binary information indicating whether or not the burst signal is transmitted after transmitting the DRS.

If receiving, from the eNB 200, the predetermined signal indicating the start of the transmission of the burst signal within the DRS transmission duration, the UE 100 determines, based on the predetermined signal, to start the reception of the burst signal after the reception of the DRS ends. Specifically, the UE 100 specifies, based on the predetermined signal, the transmission start timing of the burst signal (transmission start symbol interval) and starts the reception of the burst signal at the transmission start timing.

On the other hand, if the predetermined signal indicating the start of the transmission of the burst signal is not received from the eNB 200 within the DRS transmission duration, the UE 100 may determine not to start the reception of the burst signal after the reception of the DRS ends. Alternatively, the UE 100 may attempt to start the reception of the burst signal by searching for the initial signal included in the burst signal or performing blind decoding of the PDCCH included in the burst signal.

If there is a vacant time from the end of the transmission of the DRS up to the start of the transmission of the burst signal, the eNB 200 may transmit the reservation signal for occupying a resource of the specific frequency band within the vacant time. As a result, interruption of another device is prevented even if there is a vacant time between the DRS transmission duration and the burst signal transmission duration.

The eNB 200 may determine a transmission end timing of the burst signal so that the time from the start of the transmission of the DRS up to the end of the transmission of the burst signal does not exceed a maximum burst transmission duration. That is, the eNB 200 holds a sum of the DRS transmission duration and the burst signal transmission duration (if there is a vacant time, a sum including the vacant time) within the maximum burst transmission duration. It is noted that the maximum burst transmission duration is a maximum duration in which the transmission of the burst signal can be continued when successfully performing the LBT for the burst signal. The maximum burst transmission duration may be prescribed in advance based on the system specification.

(1.2) Case 1-2

Next, a case 1-2 will be described.

In the case 1-2, if the transmission start timing of the burst signal and the transmission start timing of the DRS collide, the eNB 200 determines, based on priority information, whether or not to prioritize the transmission of the DRS over the transmission of the burst signal. If determining to give the priority to the transmission of the DRS over the transmission of the burst signal, the eNB 200 only transmits the DRS. In this case, the eNB 200 cancels the transmission of the burst signal. Furthermore, the eNB 200 does not transmit the predetermined signal indicating the start of the transmission of the burst signal. Alternatively, the eNB 200 transmits a determination signal indicating that the transmission of the burst signal is not started.

The priority information may be information based on the transmission frequency of the DRS. Only in a case where the transmission frequency of the DRS is low, the eNB 200 may determine to prioritize the transmission of the DRS over the transmission of the burst signal. "The case where the transmission frequency of the DRS is low" may be a case where a success rate of the LBT for the DRS is low or a case where a collision rate of the DRS and the burst signal is high. The information based on the transmission frequency of the DRS may be information indicating a number of times or time in which the DRS cannot be transmitted.

If determining to prioritize the transmission of the burst signal over the transmission of the DRS, the eNB 200 may perform a process of only transmitting the burst signal. If the transmission frequency of the DRS is high, the eNB 200 determines to prioritize the transmission of the burst signal over the transmission of the DRS, only transmits the burst signal and cancels the transmission of the DRS.

(1.3) Case 1-3

Figure 12:
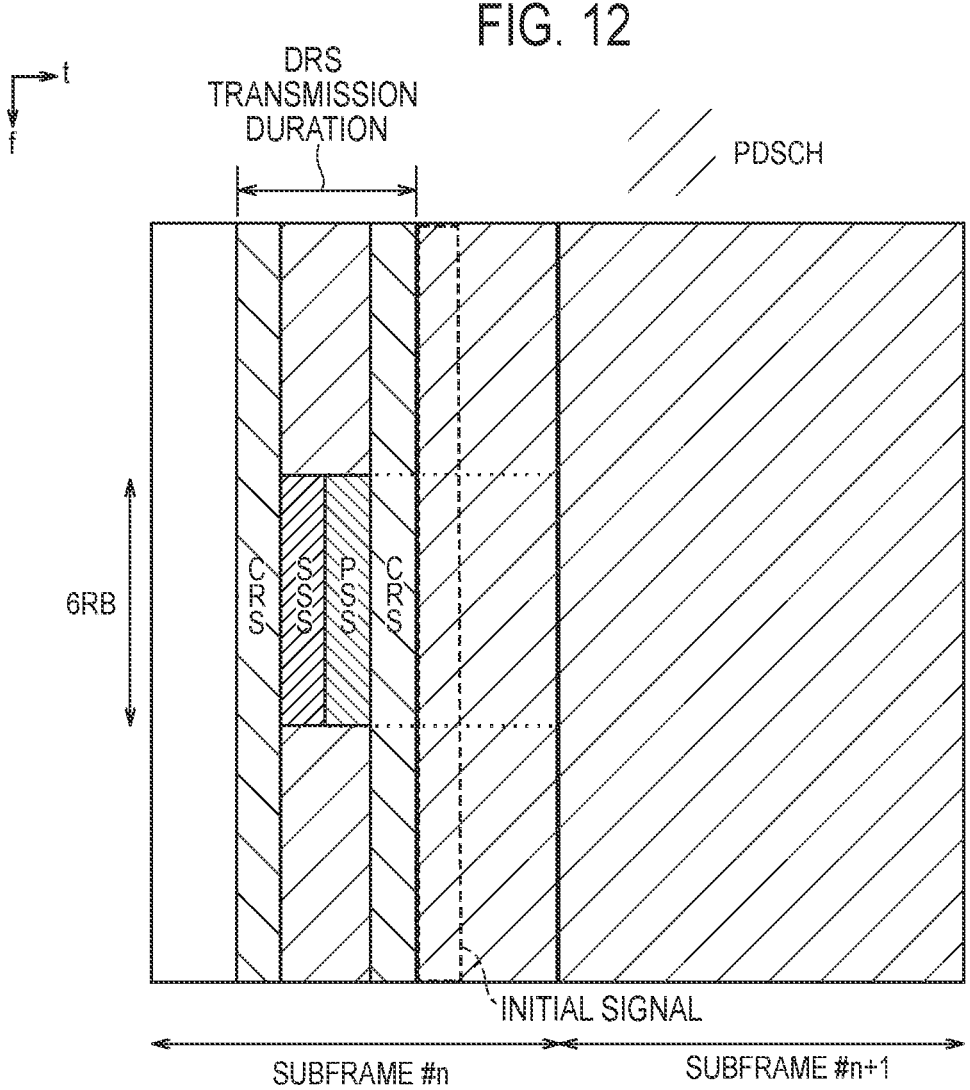
FIG. 12 is a diagram illustrating a case 1-3 according to the embodiment.

Next, a case 1-3 will be described. FIG. 12 is a diagram illustrating the case 1-3.

As illustrated in FIG. 12, if the transmission start timing of the burst signal and the transmission start timing of the DRS collide, the eNB 200 arranges the burst signal in an available resource in which the DRS is not arranged among the radio resources (resource elements) within the DRS transmission duration. The available resource is a resource element outside the PSS and the SSS in the frequency direction (a "Blank" region in FIG. 11), for example. Alternatively, the available resource may be a resource element in which the CRS is not arranged within the CRS symbol interval. As a result, the resource elements within the DRS transmission duration can be efficiently utilized. However, the burst signal may not be arranged in the entire available resource and the burst signal is arranged only in a part of the available resource.

If not grasping that the burst signal is transmitted within the DRS transmission duration, the UE 100 may perform a reception operation of the burst signal within the DRS transmission duration to attempt to receive a burst signal. For example, the reception operation includes searching the initial signal included in the burst signal or performing blind decoding on the PDCCH included in the burst signal. Here, a load accompanying the reception operation of the UE 100 can be reduced by prescribing in advance a region (resource element) in which the burst signal may be arranged.

Alternatively, if the burst signal is transmitted within the DRS transmission duration, the eNB 200 may notify the UE 100 of this transmission. As a result, the load accompanying the reception operation of the UE 100 can be reduced even more. The eNB 200 transmits information indicating that the burst signal is arranged in the available resource within the DRS transmission duration (hereinafter referred to as "burst signal arrangement information"). If the burst signal arrangement information is received from the eNB 200, the UE 100 determines that the burst signal is arranged in the available resource. Only if the burst signal is determined to be arranged in the available resource, the UE 100 may perform the reception operation of the burst signal within the DRS transmission duration. The burst signal arrangement information may include, of the available resources, information indicating a resource element in which the burst signal is arranged or the pattern thereof.

The eNB 200 may transmit the burst signal arrangement information within the DRS transmission duration. Specifically, the eNB 200 may use the signal sequence or the resource arrangement pattern of the PSS/SSS/CRS to implicitly transmit the burst signal arrangement information and may use a part of the available resource to explicitly transmit the burst signal arrangement information. The UE 100 receives and decodes the burst signal arranged in the available region, based on the burst signal arrangement information explicitly or implicitly transmitted within the DRS transmission duration.

Alternatively, the eNB 200 may transmit the burst signal arrangement information out of the DRS transmission duration. For example, the eNB 200 includes the burst signal arrangement information into the initial signal arranged in the symbol interval next to the DRS transmission duration. The UE 100 buffers the burst signal received within the DRS transmission duration until the UE 100 receives the initial signal. If the burst signal arrangement information is included in the received initial signal, the UE 100 decodes the burst signal buffered, based on the burst signal arrangement information. On the other hand, if the burst signal arrangement information is not included in the received initial signal, the UE 100 discards the buffered contents.

(2) Case 2

Figure 13:
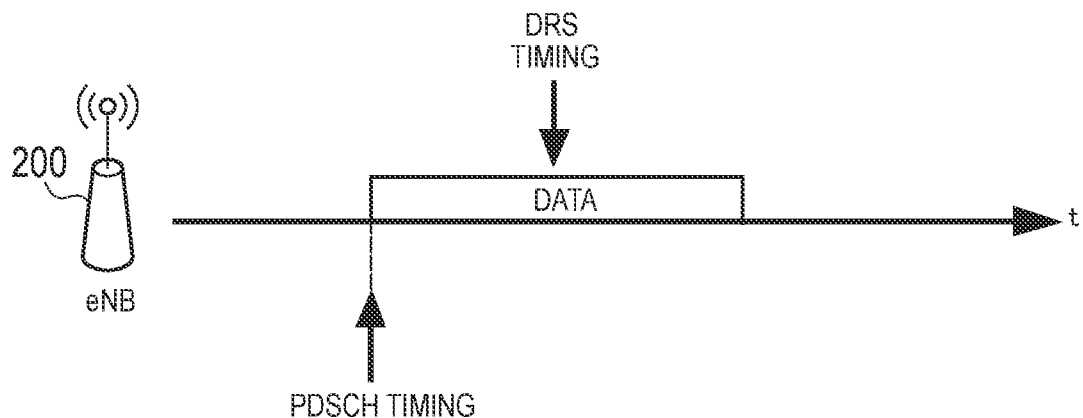
FIG. 13 is a diagram illustrating a case 2 according to the embodiment.

The case 2 will be described, below. FIG. 13 is a diagram illustrating the case 2.

As illustrated in FIG. 13, in the case 2, the eNB 200 successfully performs the LBT for the burst signal and starts the transmission of the burst signal at the same timing (PDSCH timing). Then, the DRS transmission duration (DRS timing) occurs within the burst signal transmission duration.

(2.1) Case 2-1

Figure 14B:
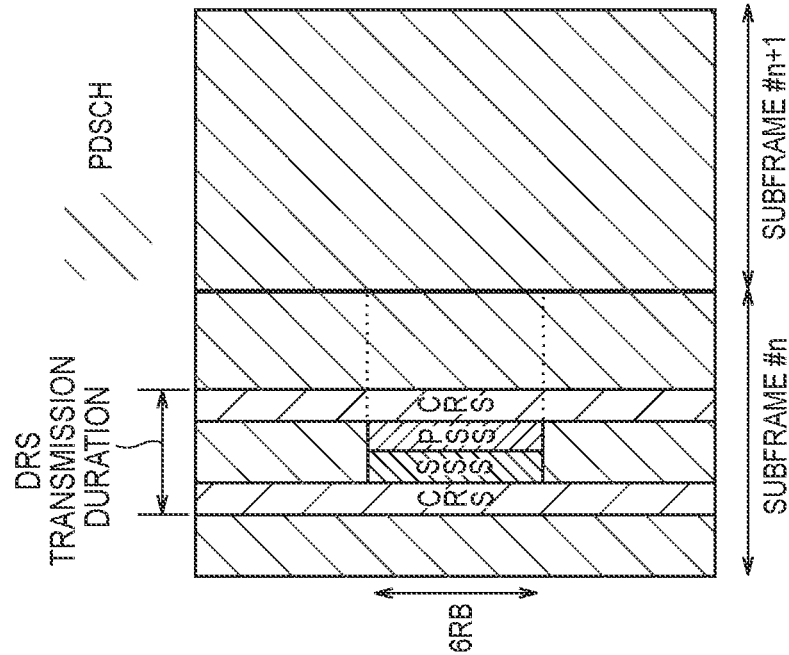
FIGS. 14A and 14B are diagrams illustrating a case 2-1 according to the embodiment.
Figure 14A:
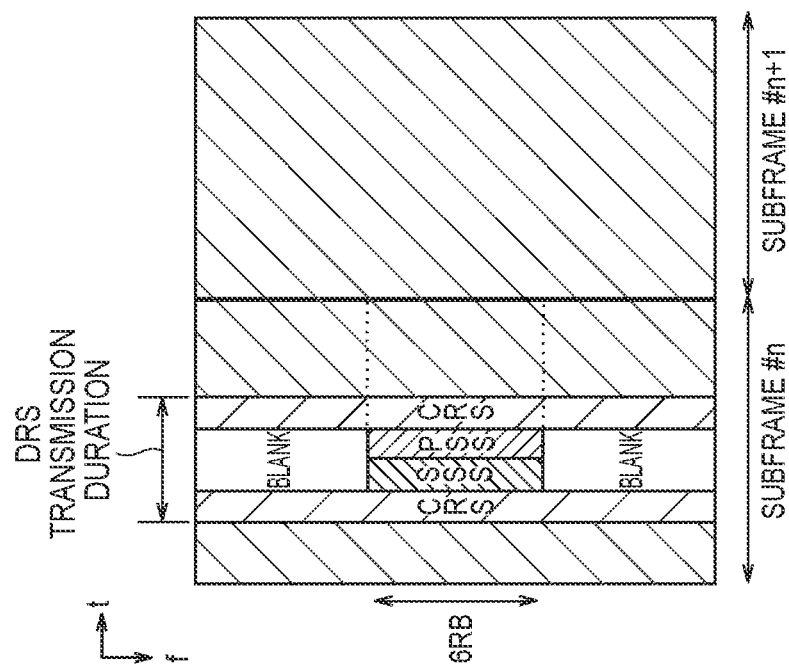

First, a case 2-1 will be described. FIGS. 14A and 14B are diagrams illustrating the case 2-1.

As illustrated in FIGS. 14A and 14B, if there is a DRS transmission duration within the burst signal transmission duration after starting the transmission of the burst signal (upon the DRS transmission start timing arriving), the eNB 200 transmits the DRS even in the burst signal transmission duration.

Furthermore, the eNB 200 transmits, to the UE 100 to which the burst signal is transmitted, information indicating that the DRS is included within the burst signal transmission duration (hereinafter referred to as "DRS information"). The DRS information may include information indicating a subframe including the DRS within the burst signal transmission duration.

If the self-scheduling is performed, the eNB 200 uses the unlicensed band (SCell of the UE 100) to transmit the DRS information to the UE 100. Specifically, the eNB 200 transmits the DRS information to the UE 100 by the initial signal, the PDCCH, or PHICH (Physical HARQ Indicator Channel). Instead of the PDCCH, ePDCCH (enhanced PDCCH) may be used. If the initial signal is used, the DRS information may be implicitly transmitted by using a signal sequence or the resource arrangement pattern of the initial signal.

If the cross-carrier scheduling is performed, the eNB 200 uses the licensed band (PCell of the UE 100) to transmit the DRS information to the UE 100. Specifically, the eNB 200 transmits the DRS information to the UE 100 by the PDCCH or the ePDCCH.

If the DRS information is received from the eNB 200, the UE 100 configured to receive the burst signal determines that the DRS is included within the burst signal transmission duration. The UE 100 receives and decodes the burst signal while avoiding the DRS within the burst signal transmission duration, based on the DRS information.

As illustrated in FIG. 14A, if the DRS is transmitted within the burst signal transmission duration, the eNB 200 does not arrange the burst signal in an available resource (for example, a Blank portion of FIG. 14A) in which the DRS is not arranged among the radio resources (resource elements) within the DRS transmission duration.

Alternatively, as illustrated in FIG. 14B, if the DRS is transmitted within the burst signal transmission duration, the eNB 200 arranges the burst signal in an available resource in which the DRS is not arranged among the radio resources (resource elements) within the DRS transmission duration. The operation in this case may be similar to the operation of the case 1-3.

In the case 2-1, if the DRS is transmitted within the burst signal transmission duration, the eNB 200 omits the determination process for transmitting the DRS (that is, the LBT for the DRS). The DRS is considered as a part of the burst signal and the LBT is executed at the time of the burst signal transmission, and thus, the LBT for the DRS is not required.

Furthermore, the eNB 200 may transmit the burst signal and the DRS by using an identical antenna port so that the reference signal included in the DRS (a CRS or a CSI-RS) functions as a demodulation reference signal. However, it is assumed that a precoding is not performed for either of the burst signal or the DRS. Such operation can be also applied to cases other than the case 2-1. The UE 100 performs a channel estimation by using the reference signal included in the DRS and demodulates and decodes the burst signal (PDSCH).

(2.2) Case 2-2

Next, a case 2-2 will be described.

In the case 2-2, the eNB 200 determines, based on the priority information, whether or not to prioritize the transmission of the DRS over the transmission of the burst signal. If determining to prioritize the transmission of the burst signal over the transmission of the DRS, the eNB 200 cancels the transmission of the DRS. The priority information is similar to the case 1-2.

(2.3) Case 2-3

Next, a case 2-3 will be described. FIGS. 15A and 15B are diagrams illustrating the case 2-3.

As illustrated in FIG. 15A, if the sum of the burst signal transmission duration and the DRS transmission duration does not exceed the maximum burst transmission duration, the eNB 200 transmits the DRS after transmitting the burst signal. Alternatively, if the sum of the burst signal transmission duration and the DRS transmission duration exceeds the maximum burst transmission duration, the eNB 200 transmits the DRS without transmitting the burst signal in a part (the last part) within the burst signal transmission duration at the last part within the burst signal transmission duration.

Alternatively, as illustrated in FIG. 15B, if there is a DRS transmission duration when the burst signal transmission duration reaches the maximum burst transmission duration, both the DRS and the burst signal are transmitted at the last part within the burst signal transmission duration. That is, if determining that the sum of the burst signal transmission duration and the DRS transmission duration exceeds the maximum burst transmission duration, the eNB 200 transmits both the DRS and the burst signal at the last part within the burst signal transmission duration so that the sum of the burst transmission duration and the DRS transmission duration does not exceed the maximum burst transmission duration. Specifically, the eNB 200 arranges the burst signal in an available resource in which the DRS is not arranged among the radio resources (resource elements) within the DRS transmission duration. This burst signal may be all or some of the burst signals planned to be transmitted within the burst signal transmission duration. The operation in this case is considered to be similar to the operation of the case 2-1.

Alternatively, if determining that the sum of the burst signal transmission duration and the DRS transmission duration exceeds the maximum burst transmission duration, the eNB 200 cancels the transmission of the DRS and may attempt to transmit the DRS in a next DRS transmission occasion.

(3) Case 3

Figure 16:
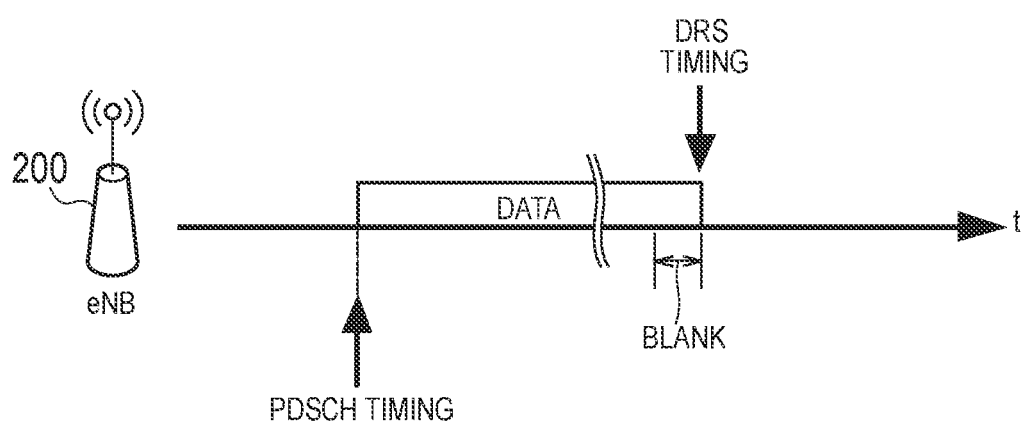
FIG. 16 is a diagram illustrating a case 3 according to the embodiment.

The case 3 will be described, below. FIG. 16 is a diagram illustrating the case 3.

As illustrated in FIG. 16, in the case 3, the burst signal transmission duration and the DRS transmission preparation duration collide. The DRS transmission preparation duration is a duration in which a determination process (LBT) for transmitting the DRS is performed. It is noted that in the case 3, the DRS transmission start timing is out of the burst signal transmission duration (the maximum burst transmission duration).

If the last part of the burst signal transmission duration and the LBT duration for the DRS collide, the eNB 200 stops the transmission of the burst signal in the last part of the burst signal transmission duration (that is, to make the last part "Blank") so as to secure the LBT duration for the DRS. As a result, the eNB 200 can perform the LBT for the DRS within the Blank duration. The Blank duration may have a fixed length or a variable length. If the Blank duration has a variable length, the eNB 200 may set the Blank duration depending on the time required for the LBT to be carried out immediately before the transmission start timing of the DRS.

If the LBT for the DRS is the LBE scheme, the eNB 200 may set the Blank duration only if a counter value used for the LBE is less than a threshold value. On the other hand, if the LBT for the DRS is the FBE scheme, the eNB 200 may set the Blank duration only if a gap between a timing at which the transmission of the burst signal is planned to end and the DRS transmission start timing is less than a constant time duration.

The eNB 200 transmits information indicating the transmission stop of the burst signal in the last part (hereinafter referred to as "stop information") to the UE 100 to which the burst signal is transmitted. The stop information may include information indicating the Blank duration. If the LBT for the DRS is the LBE scheme, the stop information may include a counter value used for the LBE. If the counter value is less than the threshold value, the UE 100 determines that the Blank duration is set.

If the self scheduling is performed, the eNB 200 uses the unlicensed band (SCell of the UE 100) to transmit the stop information to the UE 100. Specifically, the eNB 200 transmits the DRS information to the UE 100 by the initial signal, the PDCCH, or the PHICH. Instead of using the PDCCH, the ePDCCH may be used. If the initial signal is used, the signal sequence or the resource arrangement pattern of the initial signal may be used to implicitly transmit the stop information.

If the cross carrier scheduling is performed, the eNB 200 uses the licensed band (PCell of the UE 100) to transmit the stop information to the UE 100. Specifically, the eNB 200 transmits the stop information to the UE 100 by the PDCCH or the ePDCCH.

The UE 100 by which the burst signal is received grasps the Blank duration based on the stop information and receives and decodes the burst signal while avoiding the Blank duration.

Other Embodiments

In the above-described embodiment, a case in which the transmission start timings of the DRS and the burst signal (PDSCH) are the same timing (case 1) and a case in which the DRS is included within the arrangement position of the PDSCH during the burst transmission (burst signal transmission duration) (case 2) have been described. However, if the initial signal and/or the PDCCH included in the burst signal are arranged in an identical resource to the DRS, there is a possibility that the burst signal and the DRS cannot be simultaneously transmitted. Therefore, the eNB 200 should arrange the initial signal and/or the PDCCH included within the burst signal so as not to overlap with the DRS. Furthermore, a continuous transmission is possible, and thus, it is preferable that the eNB 200 matches the DRS transmission end timing with the burst transmission start timing. By doing this, there is no vacant time between the DRS transmission and the burst signal transmission and the radio resource can be used without being wasted. Furthermore, also if the DRS is mapped a plurality number of times within an identical subframe, it is preferable that the eNB 200 arranges the initial signal and/or the PDCCH so as not to overlap with the DRS as described above. If a design is such that transmission occurs with one out of a plurality of these DRS transmission candidates depending on the LBT result, it is preferable that the eNB 200 arranges the initial signal and/or the PDCCH included within the burst signal so as not to overlap with at least one out of the plurality of DRS transmission candidates in one sub frame.

If the DRS is transmitted after the initial signal, it is not always required that the initial signal and the DRS are arranged in a continuous manner. However, when assuming that the PDCCH is arranged continuously after the initial signal, the following two options are possible to prevent the DRS and the PDCCH from overlapping each other.

1) Design a position at which a data burst transmission can be started and a DRS design so that the DRS is transmitted immediately after the initial signal. Normally, the PDCCH is arranged immediately after the initial signal; however, if a multiplexing with the DRS is performed, an adjustment is made so that the PDCCH is transmitted immediately after the DRS.

2) Design the position at which the data burst transmission can be started and the DRS design so that the DRS is transmitted after the PDCCH. If a conventional specification is diverted, the number of PDCCH symbols varies, and thus, it is difficult to provide a design that the DRS is transmitted immediately after the PDCCH. Thus, the position at which the data burst transmission can be started and the DRS design are designed so that the DRS is transmitted immediately after the symbols corresponding to at least PDCCH maximum symbol number to ensure that the DRS and the PDCCH do not overlap even if the PDCCH maximum symbol number is taken.

In the above-described embodiment, an example in which the specific frequency band is an unlicensed band has been described. However, the specific frequency band may be a frequency band required to perform a determination process for determining whether or not the specific frequency band is available before transmitting a radio signal by using the specific frequency band. For example, the specific frequency band may be a frequency band requiring a license (licensed band) and be a frequency band shared by a plurality of operators and/or a plurality of communication systems.

In the above-described embodiments, an example where the same eNB 200 manages the cell #1 (licensed band) and the cell #2 (unlicensed band) has been described. However, the present invention can also apply to a case where different eNBs 200 manage the cell #1 (licensed band) and the cell #2 (unlicensed band).

In the above-described embodiment, the LTE system is exemplified as the mobile communication system. However, the present invention is not limited to the LTE system. The present invention may apply to systems other than the LTE system.

APPENDIX (1. Introduction)

This contribution provides view on multiplexing PDSCH and DRS taking into account the DRS design.

Working Assumption:

In an unlicensed carrier, DRS and PDSCH can be multiplexed and transmitted within a subframe, at least in subframes 0 and 5, where the PDSCH transmission follows Cat4 LBT scheme defined for PDSCH FFS: how to multiplex DRS and PDSCH in a same subframe FFS: whether PDSCH and DRS can be multiplexed in the same subframe, if subframe 0 or 5 is not part of the DRS occasion Agreements:

Subject to LBT, allow the DRS without PDSCH to be transmitted in one of different time positions within the configured DMTC where the DMTC timing is relative to the PCell timing. In this case, Duration of the signals in the DRS (which doesn't include potential initial signal) is less than 1 ms (a single idle sensing interval is used for the LBT procedure prior to transmission of the DRS)

FFS: Duration of the DRS occasions when the duration is less than 1 ms

FFS: case where duration of the signal in DRS is 1 ms or longer

Allow DRS transmission in subframe other than #0 and #5

Position of DRS in a subframe is the same for all candidate subframes in the DMTC Following alternatives can be considered for sequence generation for SSS/RS in subframes with DRS Alt. 1: Generate SSS/RS sequences according to the subframe index of DRS Alt. 2: Generate SSS/RS sequences irrespective of the subframe index of DRS FFS: other alternatives (2. Multiplexing PDSCH and DRS)

It is agreed on the working assumption that the PDSCH and the DRS can be multiplexed and transmitted within a subframe, at least in subframes 0 and 5. However, whether to support subframes other than subframes 0 and 5 is FFS. This contribution proposes a view with regard to the above topic.

Figure 17:
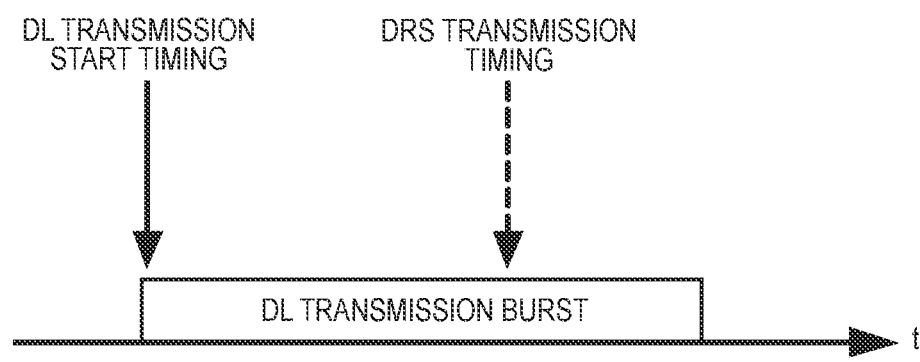
FIG. 17 is a diagram illustrating a case 1 according to an appendix.

There are two following cases:

Case1. DRS transmission timing is located within the DL transmission burst (FIG. 17)

Figure 18:
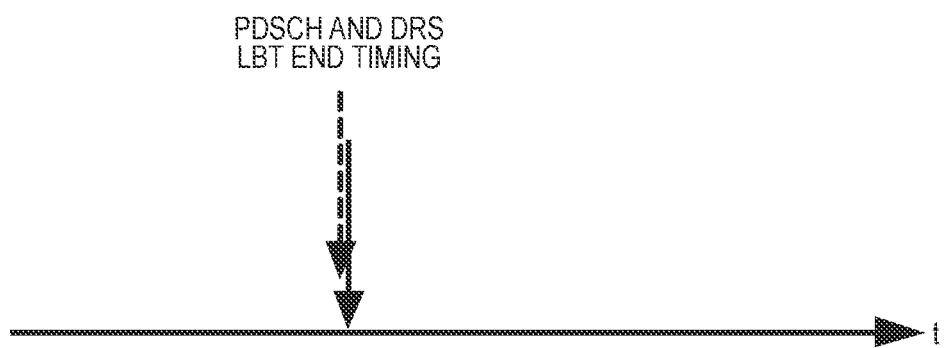
FIG. 18 is a diagram illustrating a case 2 according to the appendix.
Figure 19:
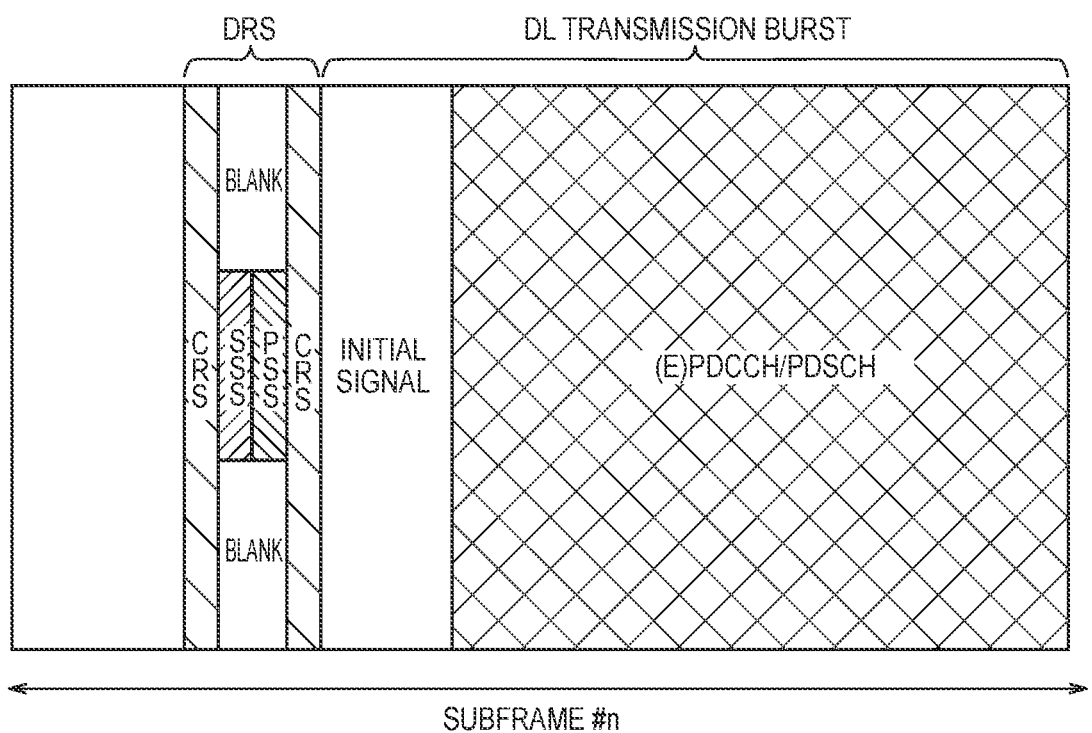
FIG. 19 is a diagram illustrating a case according to the appendix where a DRS transmission and a DL transmission burst are continuously transmitted.

Case2. Backoff counter for PDSCH is finished at the same time as DRS LBT ends. (FIG. 18)

Case 1 shows the DRS transmission is located within the duration of the DL transmission burst. In this case, eNB(s) doesn't need to carry out the LBT for DRS, since DRS is transmitted as the part of the DL transmission burst. The DRS transmissions are needed to satisfy the RRM measurement and synchronization requirements. Therefore, it is very beneficial to multiplex the PDSCH and DRS within the DL transmission burst. However, if multiplexing PDSCH and DRS in subframes other than subframes 0 and 5 is applied as well, the UE must always decode blindly the two different formats (i.e. with/without DRS) since the UE does not know this in advance. Decoding two types each time is computationally intensive. On the other hand, if initial signal used as the indication of DL start timing or PDCCH are located in each subframe during the transmission burst, overlapping between DRS and initial signal/PDCCH may occur. If the DRS and initial signal/PDCCH overlap then the eNB cannot transmit the DRS in order to maintain the data transmission. Therefore, RAN1 need to consider how the DRS and initial signal/PDCCH transmissions must be multiplexed during the transmission burst.

Proposal 1: Multiplexing PDSCH and DRS in the subframes 0 and 5 should be supported for satisfying the RRM measurement and synchronization requirements.

Proposal 2: Subframes other than subframes 0 and 5 should not be supported due to higher computational load for the UE.

Proposal 3: RAN1 needs to consider how the DRS and initial signal/PDCCH transmissions must be multiplexed during the transmission burst.

Case 2 shows the collision between the PDSCH and the DRS when both CCA mechanisms occur at that time. DRS LBT and PDSCH LBT processes are independent and regardless of the DRS LBT method (i.e. FBE or LBE) and DRS transmission method (i.e. Alt1 or Alt2) the collision could occur. If it is possible to multiplex PDSCH and DRS in the starting timing, eNB(s) has more transmission opportunities for both PDSCH and DRS. One of the simplest solutions is to apply the same PHY design for both the DRS and initial signal for PDSCH, if initial signal is introduced for detection of the DL data transmission. This allows no transmission of the initial signal in the case the DRS and data transmission start at the same time. However, initial signal may include some information relevant to the DL transmission burst. Therefore, we may consider this aspect if DRS and initial signal have the same PHY designs.

Proposal 4: RAN1 should consider a portion of initial signal design has the same PHY design as the DRS.

On the other hand, if DRS and initial signal have different PHY design or initial signal isn't introduced then we should consider different method to multiplex the PDSCH and the DRS. Considering RRM measurement based on a single DRS occasion, the DRS would require higher density of CRS per OFDM symbols compared to Rel.12. Therefore, it is difficult to multiplex DRS and initial signal or (E)PDCCH/PDSCH in the same OFDM symbol. Whereas it is possible to multiplex DRS and DL transmission burst in time domain if the DRS and DL transmission burst are transmitted continuously as shown in FIG. 3. In this case, there is no problem to transmit them continuously since both of the LBT methods are already finished; however, the maximum transmission burst length includes the durations of DRS. Some companies have suggested to limit the transmission time in the subframe to lower the UE complexity and specification impacts. If the start time of the OFDM symbol is limited, we should consider the start time of DL transmission burst to be located right after the end of DRS transmission. However, when there is a blank space between the DRS and DL transmission burst, the eNB should be able to transmit the reservation signal within the blank space. It is possible to transmit DRS and DL transmission burst continuously as long as these signals duration do not overlap. If the DRS and initial signal duration overlaps then the eNB can only transmit either the DRS or the initial signal. Therefore, RAN1 should consider DRS and DL transmission burst timing when both are transmitted continuously.

Proposal 5: RAN1 should support start time of the DL transmission burst to be located right after the end of the DRS for the case where both PDSCH and DRS CCA mechanisms are finished at the same.

INDUSTRIAL APPLICABILITY

The present invention is useful in the field of communication.

The invention claimed is:

1. A base station, comprising:
a controller configured to:
perform a process of transmitting, in a specific frequency band shared by a plurality of operators and/or a plurality of communication systems, a burst signal including data and a discovery reference signal including a reference signal and/or a synchronization signal,
in response to determining that, within the specific frequency band, a start of a transmission duration of the discovery reference signal is within a transmission duration of the burst signal and the start of the transmission duration of the discovery reference signal is after starting transmission of the burst signal, the controller is configured to perform a process of transmitting the discovery reference signal even within the transmission duration of the burst signal, and
in response to determining that the start of the transmission duration of the discovery reference signal and the starting transmission of the burst signal collides, the controller is further configured to:
determine, based on priority information, whether or not to prioritize the transmission of the discovery reference signal over the transmission of the burst signal,
the priority information being based on a frequency of transmission of the discovery reference signal, wherein the frequency of transmission is based on at least one of: a collision rate between the discovery reference signal and the burst signal, a success rate of listen-before-talk operations for the discovery reference signal, and a number of times the discovery reference signal cannot be transmitted;
in response to determining to prioritize the transmission of the burst signal over the transmission of the discovery reference signal, only perform the transmission of the burst signal and cancel the transmission of the discovery reference signal; and
in response to determining to prioritize the transmission of the discovery reference signal over the transmission of the burst signal, cancel transmission of the burst signal and only perform the transmission of the discovery reference signal.

2. The base station according to claim 1, wherein the controller performs a process of transmitting, to a radio terminal to which the burst signal is transmitted, information indicating that the discovery reference signal is included within the transmission duration of the burst signal.

3. The base station according to claim 1, wherein if the discovery reference signal is transmitted within the transmission duration of the burst signal, the controller arranges the burst signal in an available resource in which the discovery reference signal is not arranged, among radio resources within the transmission duration of the discovery reference signal.

4. The base station according to claim 1, wherein the specific frequency band is a frequency band required for the controller to determine whether or not the specific frequency band is available before transmitting a radio signal by using the specific frequency band, and
in response to the discovery reference signal being transmitted within the transmission duration of the burst signal, the controller omits the determination process for transmitting the discovery reference signal.

5. The base station according to claim 1, wherein the controller is configured to transmit the burst signal and the discovery reference signal by using an identical antenna port so that the reference signal included in the discovery reference signal functions as a demodulation reference signal.

6. A base station that can execute communication with a radio terminal in a licensed band and an unlicensed band, comprising:
a controller configured to:
transmit, to the radio terminal, a physical downlink shared channel (PDSCH) and a discovery signal including a reference signal and a synchronization signal in the unlicensed band;
in response to determining that, within the unlicensed band, a start of a transmission duration of the discovery signal is within a transmission duration of the PDSCH and the start of the transmission duration of the discovery signal is after starting transmission of the PDSCH, the controller is configured to perform a process of transmitting the discovery signal even within the transmission duration of the PDSCH; and
in response to determining that the start of the transmission duration of the discovery signal and the starting transmission of the PDSCH collides, the controller is further configured to:
determine, based on priority information, whether or not to prioritize the transmission of the discovery signal over the transmission of the PDSCH,
the priority information being based on a frequency of transmission of the discovery signal, wherein the frequency of transmission is based on at least one of: a collision rate between the discovery signal and the burst signal, a success rate of listen-before-talk operations for the discovery signal, and a number of times the discovery signal cannot be transmitted;
in response to determining to prioritize the transmission of the PDSCH over the transmission of the discovery signal, only perform the transmission of the PDSCH and cancel the transmission of the discovery signal; and
in response to determining to prioritize the transmission of the discovery signal over the transmission of the PDSCH, cancel transmission of the PDSCH and only perform the transmission of the discovery signal.

7. A base station that can execute communication with a radio terminal in a licensed band and an unlicensed band, comprising:
a controller configured to transmit, to the radio terminal, a physical downlink shared channel (PDSCH) and a discovery signal including a synchronization signal in the unlicensed band,
wherein the controller is configured to:
in response to determining that, within the unlicensed band, a start of a transmission duration of the discovery signal is within a transmission duration of the PDSCH and the start of the transmission duration of the discovery signal is after starting transmission of the PDSCH, simultaneously perform transmission of the PDSCH and transmission of the discovery signal, and in response to determining that the start of the transmission duration of the discovery signal and the starting transmission of the PDSCH collides, the controller is further configured to:

determine, based on priority information, whether or not to prioritize the transmission of the discovery signal over the transmission of the PDSCH;

the priority information being based on a frequency of transmission of the discovery signal, wherein the frequency of transmission is based on at least one of: a collision rate between the discovery signal and the burst signal, a success rate of listen-before-talk operations for the discovery signal, and a number of times the discovery signal cannot be transmitted;

in response to determining to prioritize the transmission of the PDSCH over the transmission of the discovery signal, only perform the transmission of the PDSCH and cancel the transmission of the discovery signal; and in response to determining to prioritize the transmission of the discovery signal over the transmission of the PDSCH, cancel transmission of the PDSCH and only perform the transmission of the discovery signal.

\* \* \* \* \*